(12) United States Patent
Ablabutyan et al.

(10) Patent No.: US 8,382,420 B2
(45) Date of Patent: Feb. 26, 2013

(54) CART STOP

(75) Inventors: Karapet Ablabutyan, Glendale, CA (US); Aida Sahakyan, Glendale, CA (US)

(73) Assignee: Maxon Industries, Inc., Santa Fe Springs, CA (US)

(*) Notice: Subject to any disclaimer, the term of this patent is extended or adjusted under 35 U.S.C. 154(b) by 580 days.

(21) Appl. No.: 12/475,315

(22) Filed: May 29, 2009

(65) Prior Publication Data

US 2009/0297313 A1  Dec. 3, 2009

Related U.S. Application Data

(63) Continuation-in-part of application No. 11/670,956, filed on Feb. 2, 2007, now Pat. No. 7,857,573.

(51) Int. Cl.
*B60P 1/44* (2006.01)

(52) U.S. Cl. .......................... 414/556; 414/558; 187/217

(58) Field of Classification Search .................. 414/545, 414/556–558; 16/286, 289, 291; 187/217
See application file for complete search history.

(56) References Cited

U.S. PATENT DOCUMENTS

| | | | | |
|---|---|---|---|---|
| 2,098,376 | A | * | 11/1937 | Cunneen ........................ 187/217 |
| 2,702,651 | A | | 2/1955 | Graham |
| 3,233,767 | A | | 2/1966 | Goodacre |
| 3,458,013 | A | * | 7/1969 | Haynes ......................... 187/221 |
| 3,539,802 | A | | 11/1970 | Garnett et al. |
| 3,870,126 | A | | 3/1975 | Himes |
| 5,683,221 | A | | 11/1997 | Ablabutyan |
| 7,258,386 | B2 | | 8/2007 | Leitner |
| 7,407,352 | B2 | | 8/2008 | Wilson |
| 2002/0130531 | A1 | | 9/2002 | Leitner |
| 2008/0184524 | A1 | | 8/2008 | Ablabutyan et al. |

FOREIGN PATENT DOCUMENTS

| | | |
|---|---|---|
| EP | 0487145 A1 | 5/1992 |
| EP | 0480791 B1 | 1/1994 |
| EP | 1318045 B1 | 11/2005 |

OTHER PUBLICATIONS

Notification of Transmittal of the International Search Authority, International Search Report and the Written Opinion dated Jul. 29, 2010 for International Application No. PCT/US2010/036426 from the International Searching Authority, filed May 27, 2010, pp. 1-10.
U.S. Advisory Action for U.S. Appl. No. 11/670,956 dated Mar. 2, 2010.
U.S. Notice of Allowance for U.S. Appl. No. 11/670,956 dated Aug. 16, 2010.
International Preliminary Report on Patentability and Written Opinion dated Dec. 8, 2011 for International Application No. PCT/US2010/036426 from International Bureau, filed May 27, 2010, pp. 1-7, Geneva, Switzerland.
U.S. Final Office for U.S. Appl. No. 11/670,956 mailed on Dec. 23, 2009.
U.S. Non-final Office for U.S. Appl. No. 11/670,956 mailed on Apr. 28, 2009.

* cited by examiner

*Primary Examiner* — Saul Rodriguez
*Assistant Examiner* — Jonathan Snelting
(74) *Attorney, Agent, or Firm* — Michael Zarrabian, Esq.; Sherman & Zarrabian LLP

(57) ABSTRACT

A cart stop suitable for use with a lift platform is described. The cart stop has a closed position which allows a cart or other wheeled device to move over it. The cart stop also has an open position which prevents the cart or other wheeled device from rolling off of the lift platform.

42 Claims, 25 Drawing Sheets

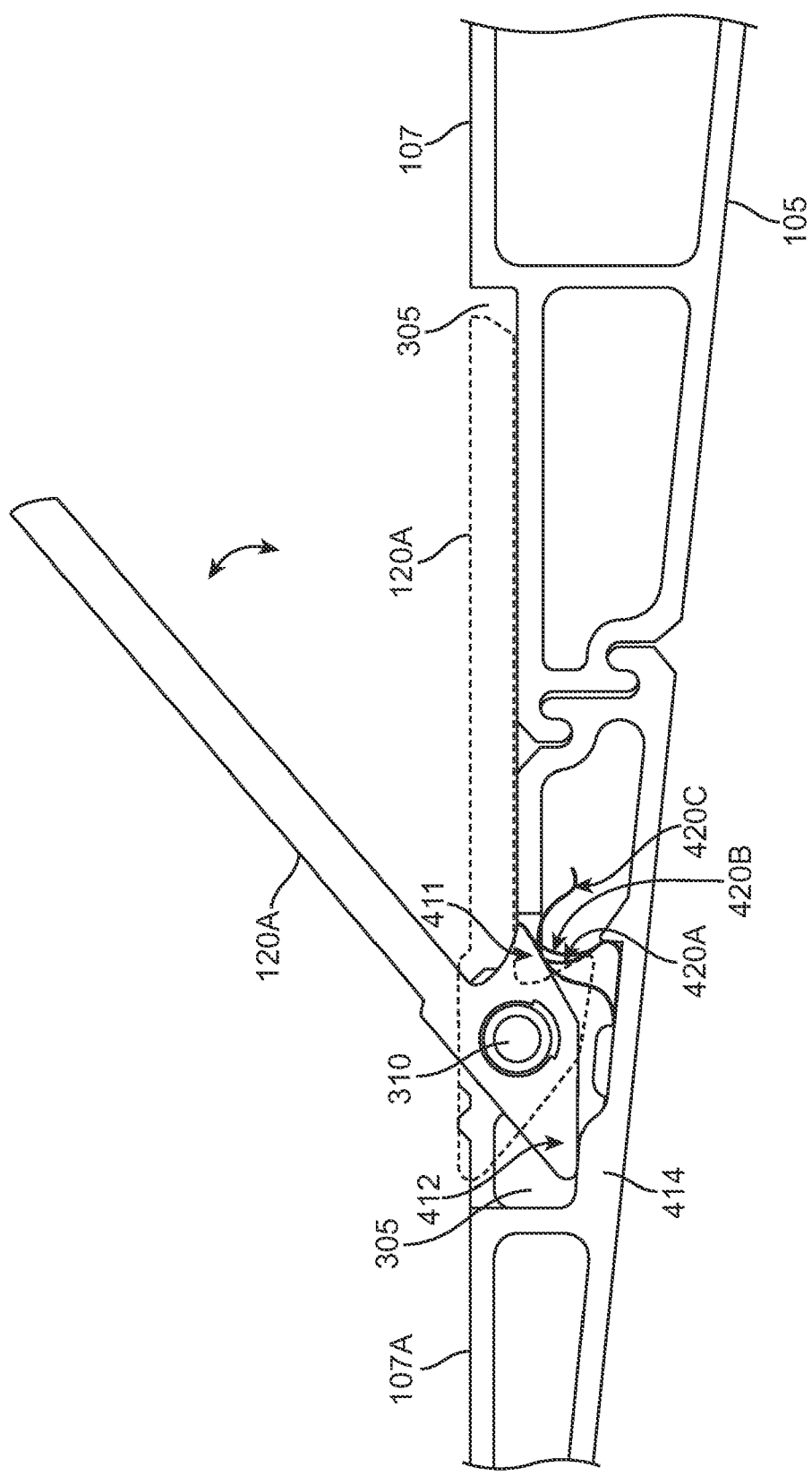

CART STOP

CROSS-REFERENCE TO RELATED APPLICATIONS

This application is a continuation-in-part of, and claims the benefit under 35 U.S.C. §120 of, U.S. patent application Ser. No. 11/670,956 filed on Feb. 2, 2007, titled "CART STOP."

BACKGROUND

1. Field of the Invention

The present invention relates generally to lift platforms. In particular, the present invention relates to a cart stop for a lift platform.

2. Background Information

Lift platforms are used to raise and lower loads to and from a vehicle bed. Lift platforms are often used to carry a cart or other wheeled device. Such carts or other wheeled devices may roll off the lift platform, especially when the lift platform is in motion or not level.

BRIEF SUMMARY

A cart stop system for a lift platform is provided which prevents carts or other wheeled devices from rolling off the lift platform. In one embodiment, the cart stop system comprises a moveable cart stop platform section and a first locking member including a cam member. The locking member is configured to engage and hold down the moveable cart stop platform section in a closed position, and to release the moveable cart stop platform section to raise to an open position. The locking member further including a first spring device positioned to bias against the cam when the moveable cart stop platform section is moved towards the closed position by a downforce.

Unless a downforce greater than a specified magnitude is applied to the moveable cart stop platform section to lower the moveable cart stop platform section, the moveable cart stop platform section remains in the open position. In the open position the moveable cart stop platform section blocks cart wheels from rolling over the moveable cart stop platform section and off said upper surface of the lift platform. In the closed position the moveable cart stop platform section is substantially level with an upper surface of the lift platform to allow cart wheels to roll over the moveable cart stop platform section and off said upper surface of the lift platform.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which:

FIGS. 7A-B illustrate sectional views of a cart stop platform lock in closed and open positions, respectively, according to an embodiment of the invention;

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for cart stops, as well as operation and/or component parts thereof. While the following description will be described in terms of cart stops for clarity and to place the invention in context, it should be kept in mind that the teachings herein may have broad application to all types of systems, devices and applications.

A cart stop system for a lift platform is provided which prevents carts or other wheeled devices from rolling off the lift platform. In one embodiment, the cart stop system includes at least one moveable cart stop platform section and at least one locking member including a cam member to hold down and release the moveable cart stop platform section. When the cart stop platform is in a held down or closed position, the moveable cart stop platform section is substantially level with an upper surface of the lift platform.

Figure 1A:
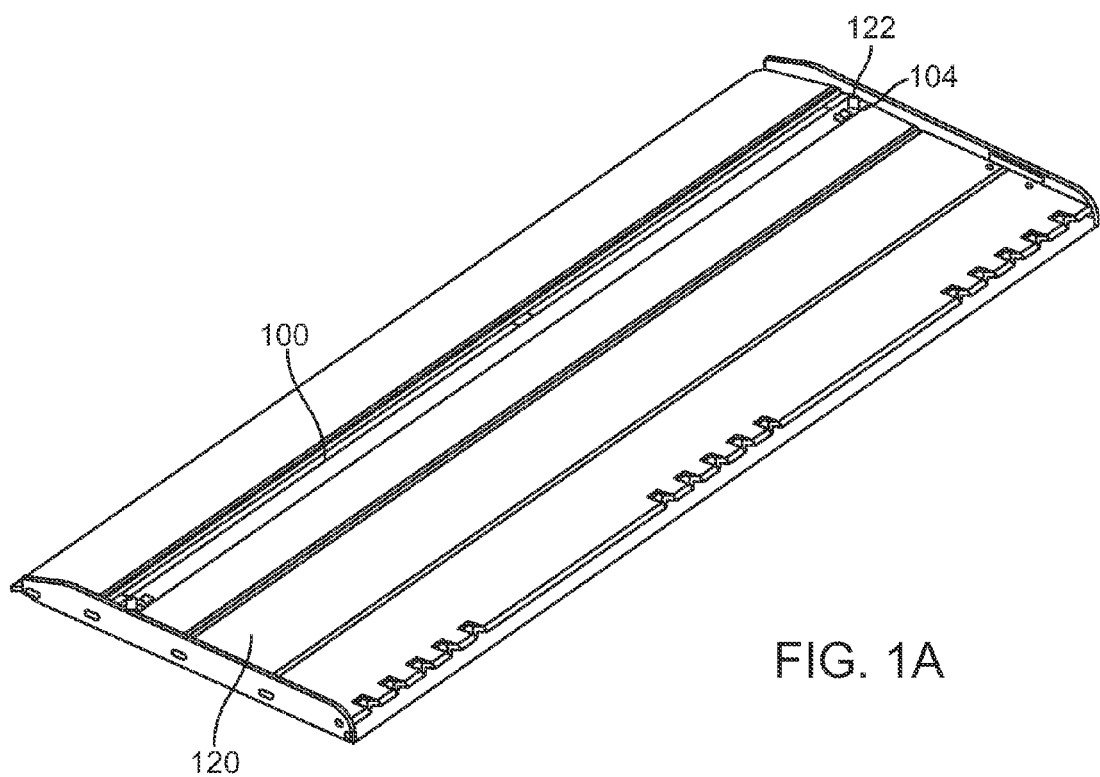
FIGS. 1A-1B show one embodiment of a cart stop in accordance with the present invention.
Figure 1B:
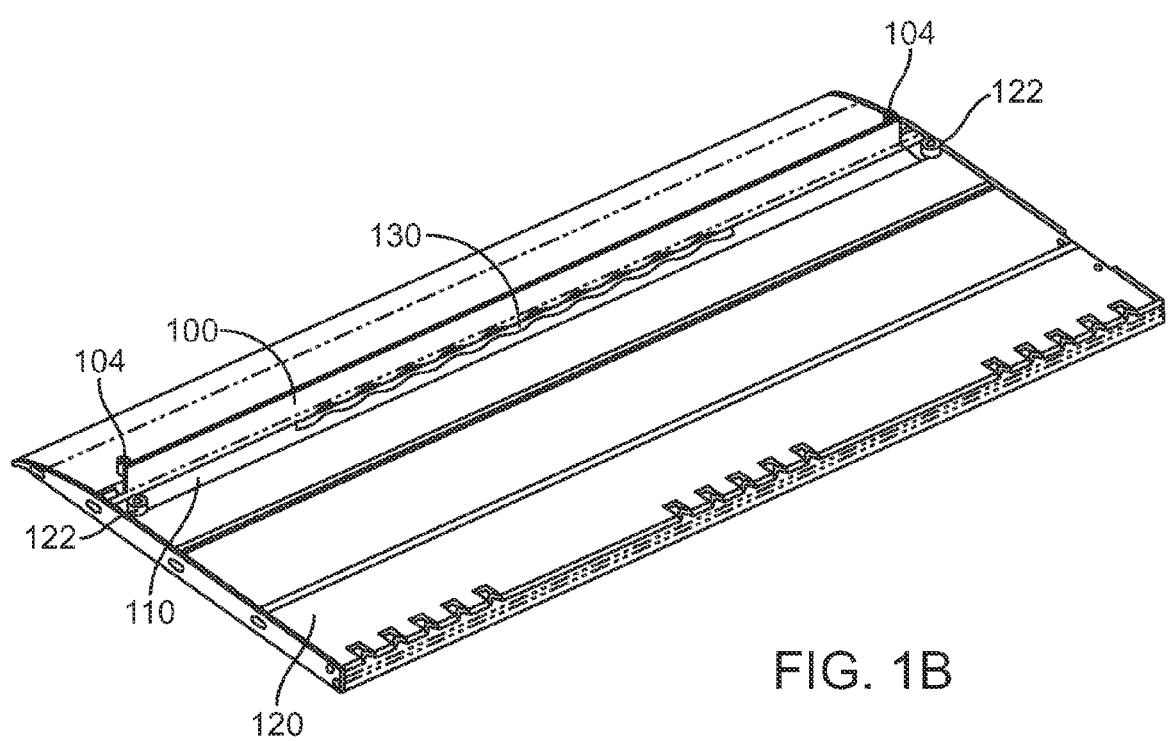

FIGS. 1A-1B show one embodiment of a cart stop in accordance with the present invention. Cart stop 100 is at least partially located in a channel 110 in a platform 120. Cart stop 100 moves between a closed position shown in FIG. 1A and an open position shown in FIG. 1B. Cart stop 100 in the closed position is substantially flat with platform 120. Cart stop 100 in the open position may be in any position or angle other than substantially flat with platform 120.

In the closed position, cart stop 100 may be configured so that it does not extend beyond an upper surface of platform 120. This allows carts and other wheeled devices to move over cart stop 100 in the closed position. In the open position, cart stop 100 serves to prevent a cart or other wheeled device from rolling off of platform 120 when platform 120 is in use or not level.

In one embodiment, cart stop 100 may have a toe flip 104 which extends above an upper surface of platform 120 when cart stop 100 is in the closed position. Toe flip 104 is suitably configured so that it can be used to flip open cart stop 100 when cart stop 100 is in the closed position. More than one toe flip 104 may be used with cart stop 100. For example, cart stop 100 may have a toe flip 104 on each end of cart stop 100. In another embodiment, toe flip 104 may extend from the side of platform 120, without extending above an upper surface of platform 120 when cart stop 100 is in the closed position.

Figure 1C:
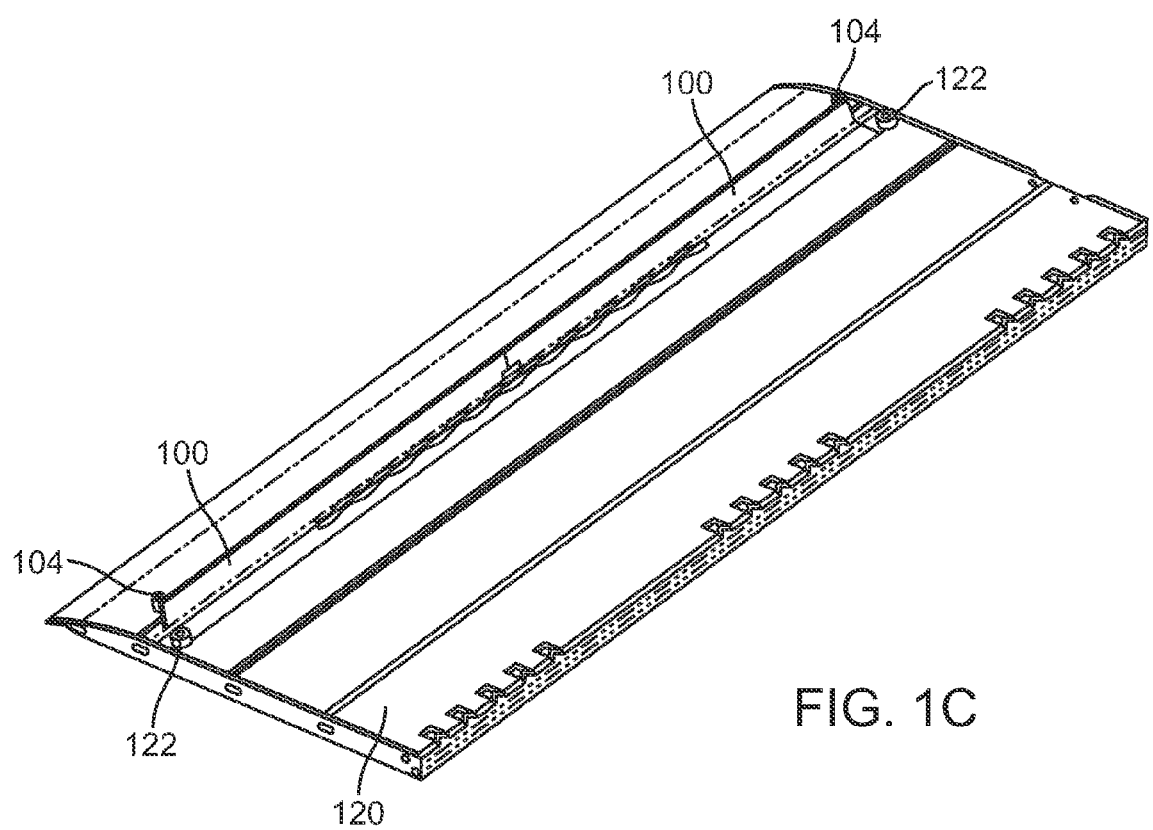
FIG. 1C shows another embodiment of a cart stop in accordance with the present invention.

In the embodiment shown in FIGS. 1A and 1B, cart stop 100 extends substantially the width of platform 120. FIG. 1C shows another embodiment of cart stop 100 in accordance with the present invention. In this embodiment, cart stop 100 has two segments, each of which extends about half the width of platform 120. Each segment may be independently opened and closed. Alternatively, each segment may be independently opened and/or closed, but closing or opening either segment will also close or open the other segment. Each segment may have a toe flip 104. Cart stop 100 may also have more than two segments.

Platform 120 is suitable for use with a wide variety of lifts and lifting devices. Platform 120 may include one or more foldable sections. When platform 120 includes foldable sections, bumpers 122 may be used to prevent cart stop 100 in the open position and/or toe flip 104 from striking another section of platform 120 when platform 120 is folded.

Figure 2A:
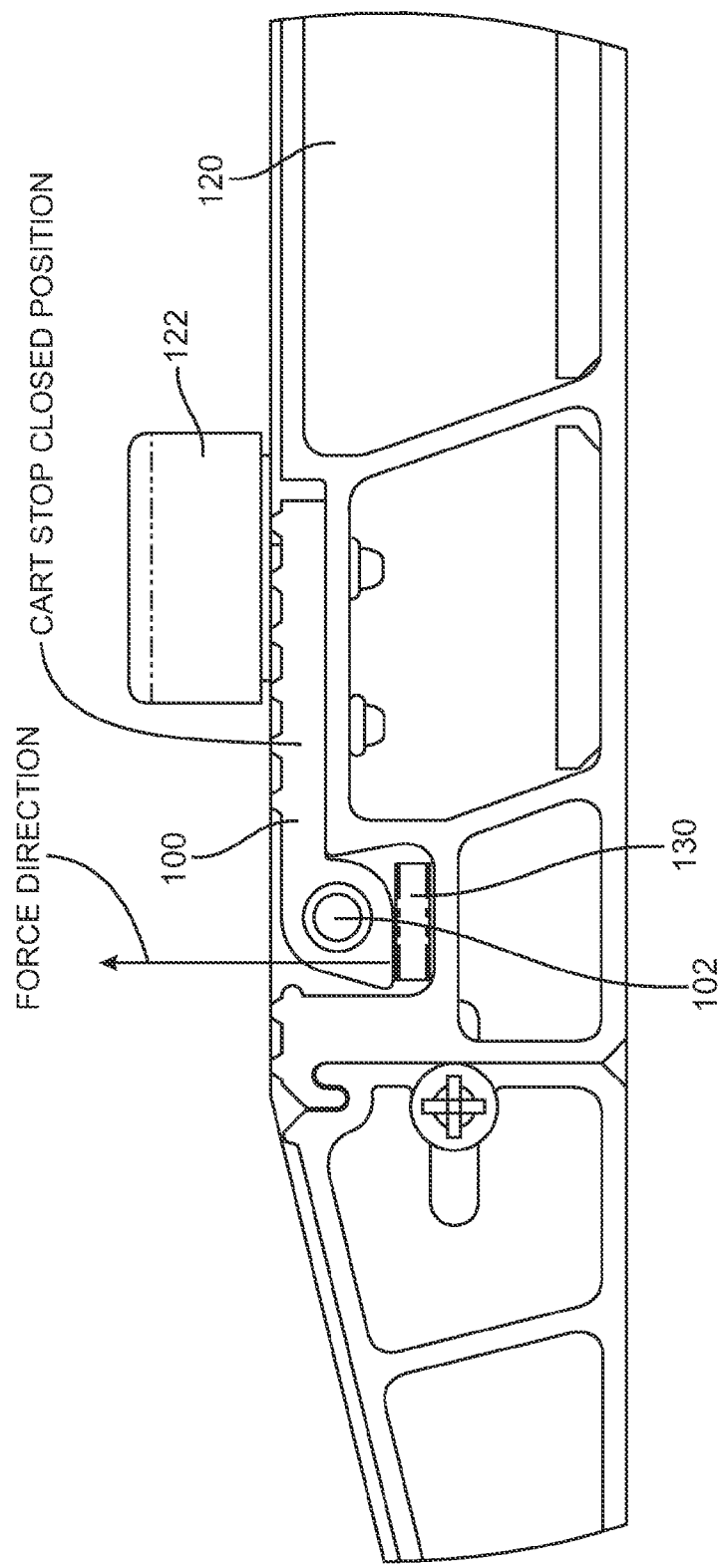
FIGS. 2A-2B show a cross-sectional view of one embodiment of a cart stop in accordance with the present invention.
Figure 2B:
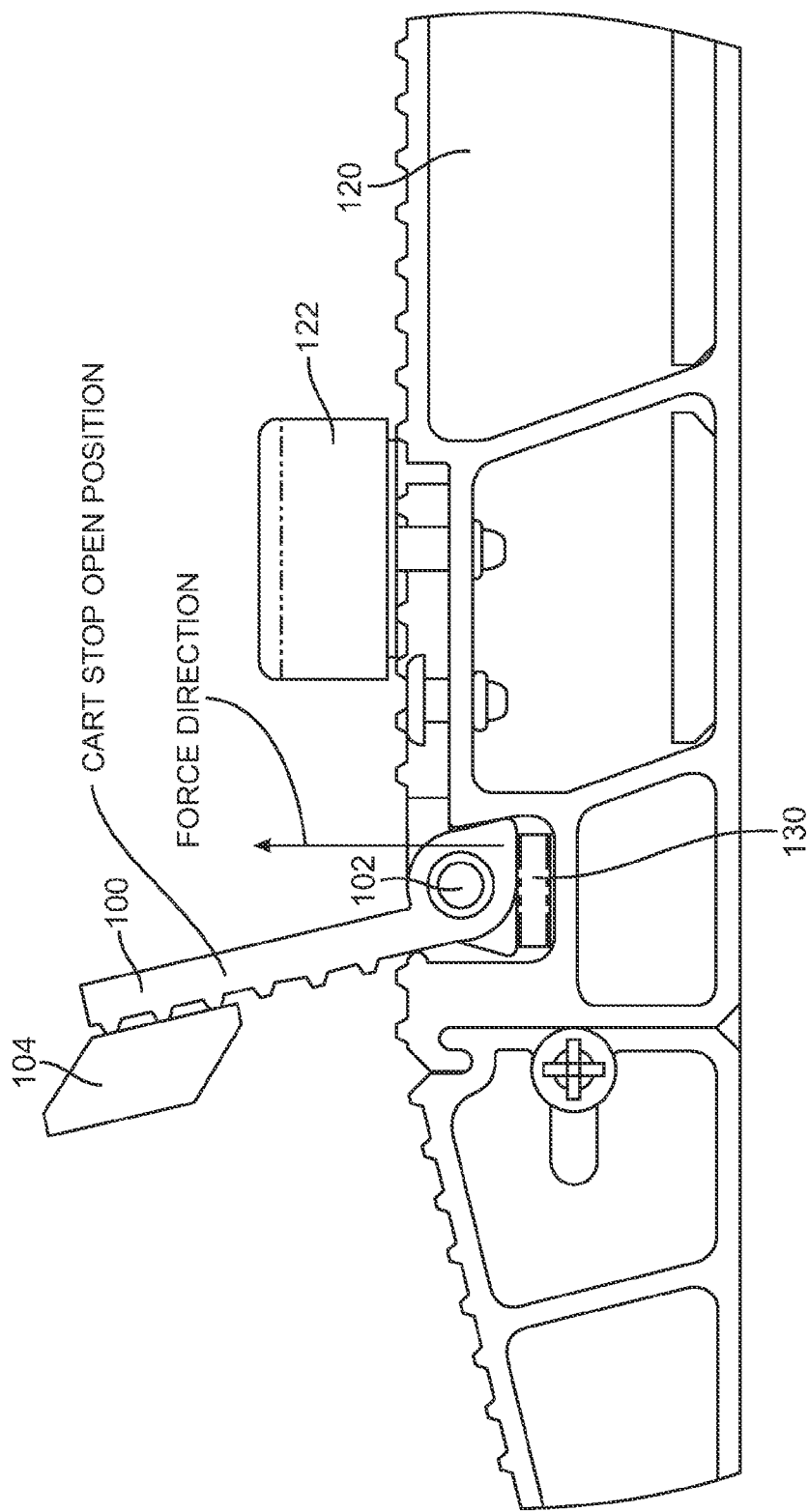

FIGS. 2A-2B show a cross-sectional view of one embodiment of a cart stop in accordance with the present invention. Cart stop 100 rotates about a pin 102. Channel 110 (FIG. 1A) is suitably configured to accommodate cart stop 100. In one embodiment, a spring device 130 is located in a space at the bottom of channel 110 and is in contact with cart stop 100. Cart stop 100 has surfaces which, along with spring device 130, bias cart stop 100 in either the open position or the closed position. In one embodiment, cart stop 100 has a profile with two substantially flat surfaces corresponding to the open position and the closed position, and a pointed section which serves to deform spring device 130 when cart stop 100 is moved between the open position and the closed position. In another embodiment, cart stop 100 has a cam-like profile. Through the selection of a suitable profile for cart stop 100 and a suitable spring rate for spring device 130, a desired force can be selected necessary to move cart stop 100 between the open position and the closed position. Spring device 130 may also be located at the rear, side, or any other suitable location in channel 110. Spring device 130 may be positioned horizontally or vertically in channel 110.

Spring device 130 serves to prevent cart stop 100 from inadvertently closing when cart stop 100 is in the open position. Spring device 130 also serves to prevent cart stop 100 from inadvertently opening when cart stop 100 is in the closed position. Spring device 130 also serves to prevent cart stop 100 from rattling or shaking when cart stop 100 is in the closed position.

To reduce the forces acting on pin 102 when an object presses against cart stop 100, clearance may be designed around pin 102 which allows cart stop 100 to "float" and stop up against a side of channel 110.

Figure 3:
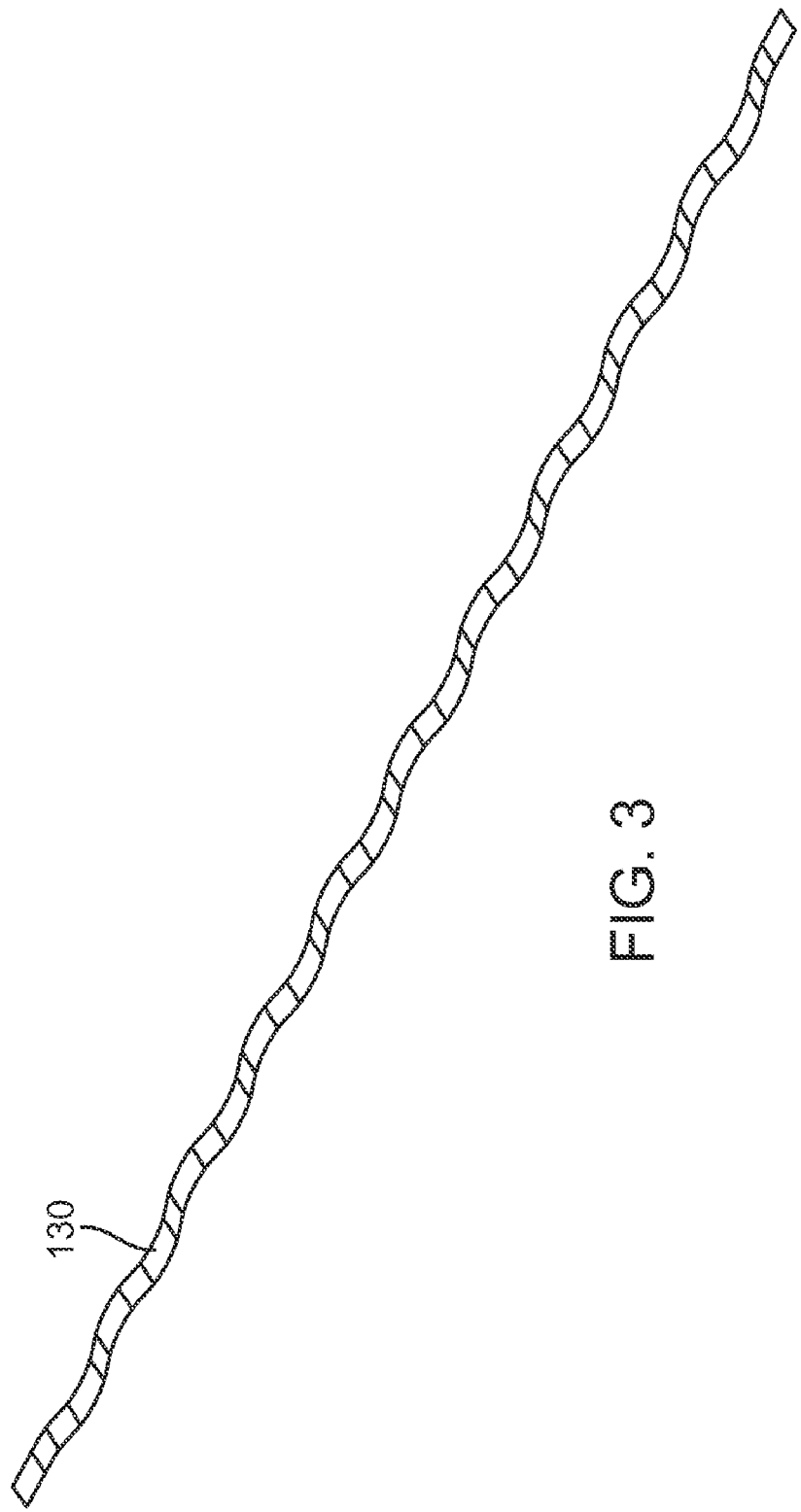
FIG. 3 shows one embodiment of a spring device suitable for use with the cart stop of the present invention.

FIG. 3 shows one embodiment of a spring device 130 suitable for use with the cart stop of the present invention. Spring device 130 has a profile that resembles a wave. Spring device 130 may be made of steel, aluminum, or any other suitable material. Spring device 130 may have substantially the same length as the width of platform 120, or may be shorter. By changing length of spring device 130, and thus the number of "waves" in spring device 130, the force necessary to open or close cart stop 100 can be modified. Spring device 130 may be a single leaf spring. Spring device 130 may be retained by the configuration of cart stop 100 and channel 110. Spring device 130 may be substantially the same width as channel 110.

Figure 4:
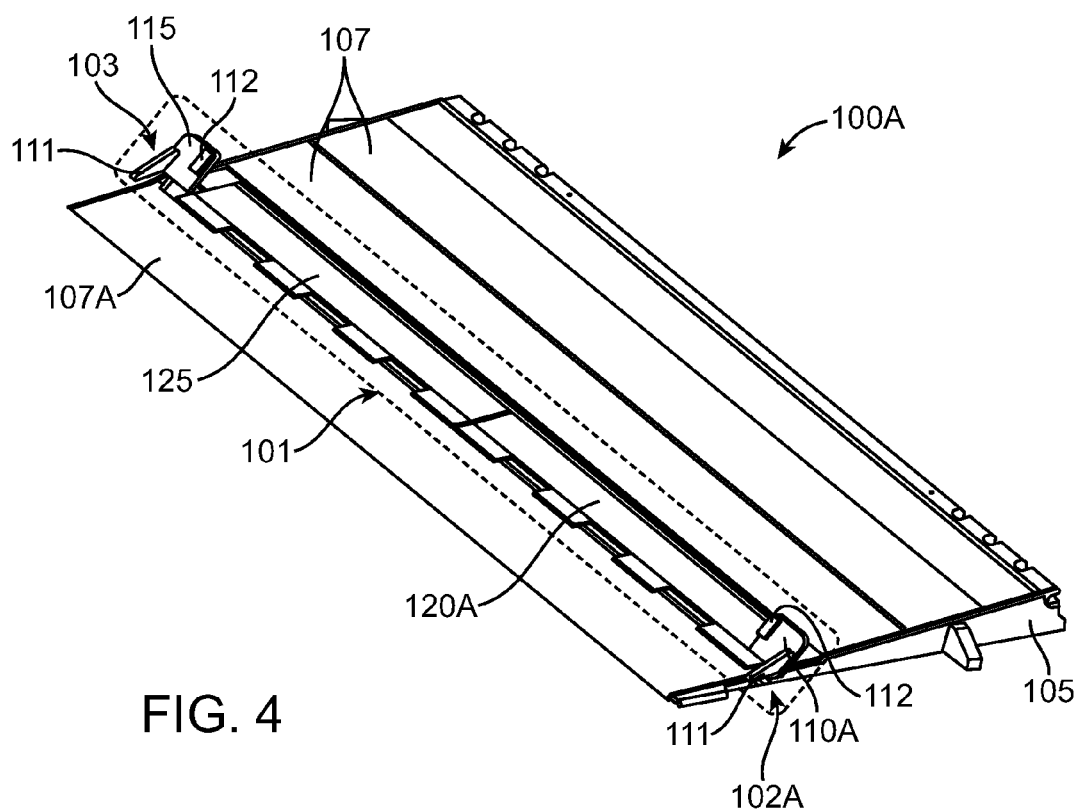
FIG. 4 illustrates a lift platform including a cart stop system having dual cart stop platforms and cart stop platform locks, according to an embodiment of the invention.
Figure 5:
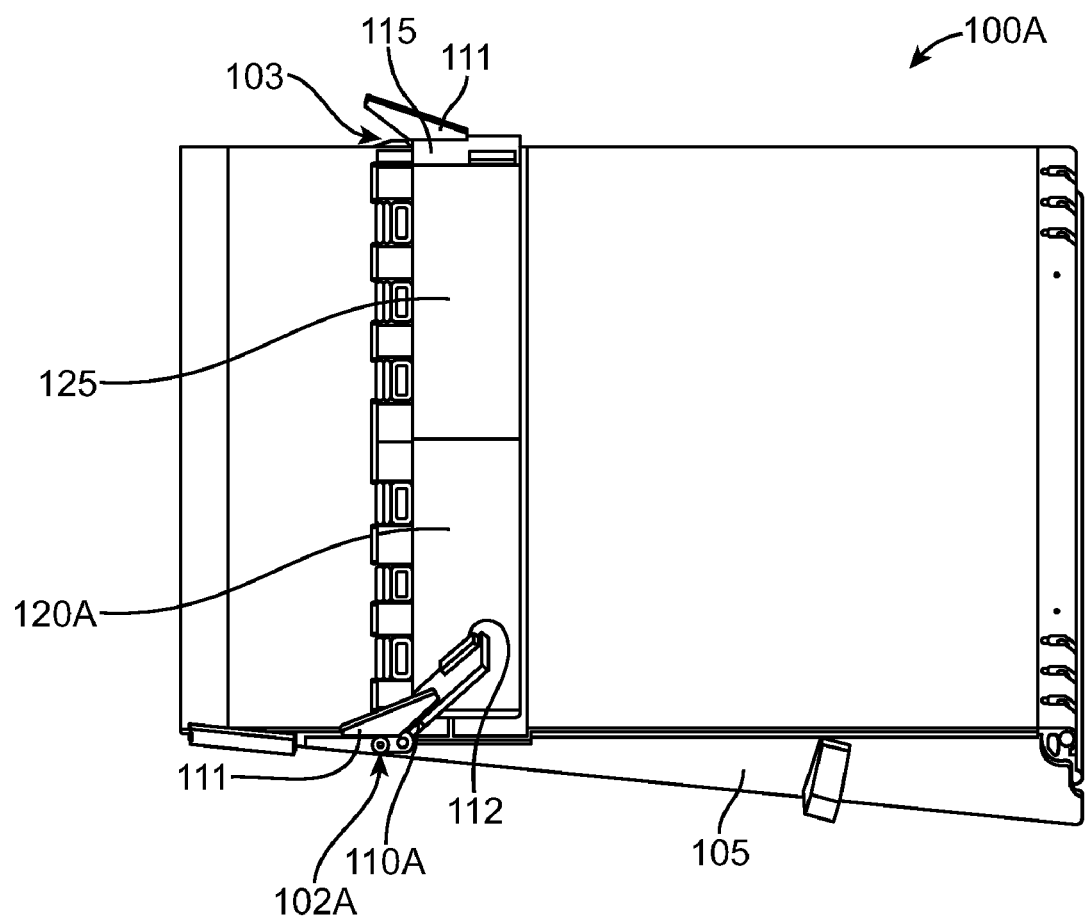
FIG. 5 illustrates a right side perspective view of a lift platform including a cart stop system having dual cart stop platforms, according to an embodiment of the invention.
Figure 6:
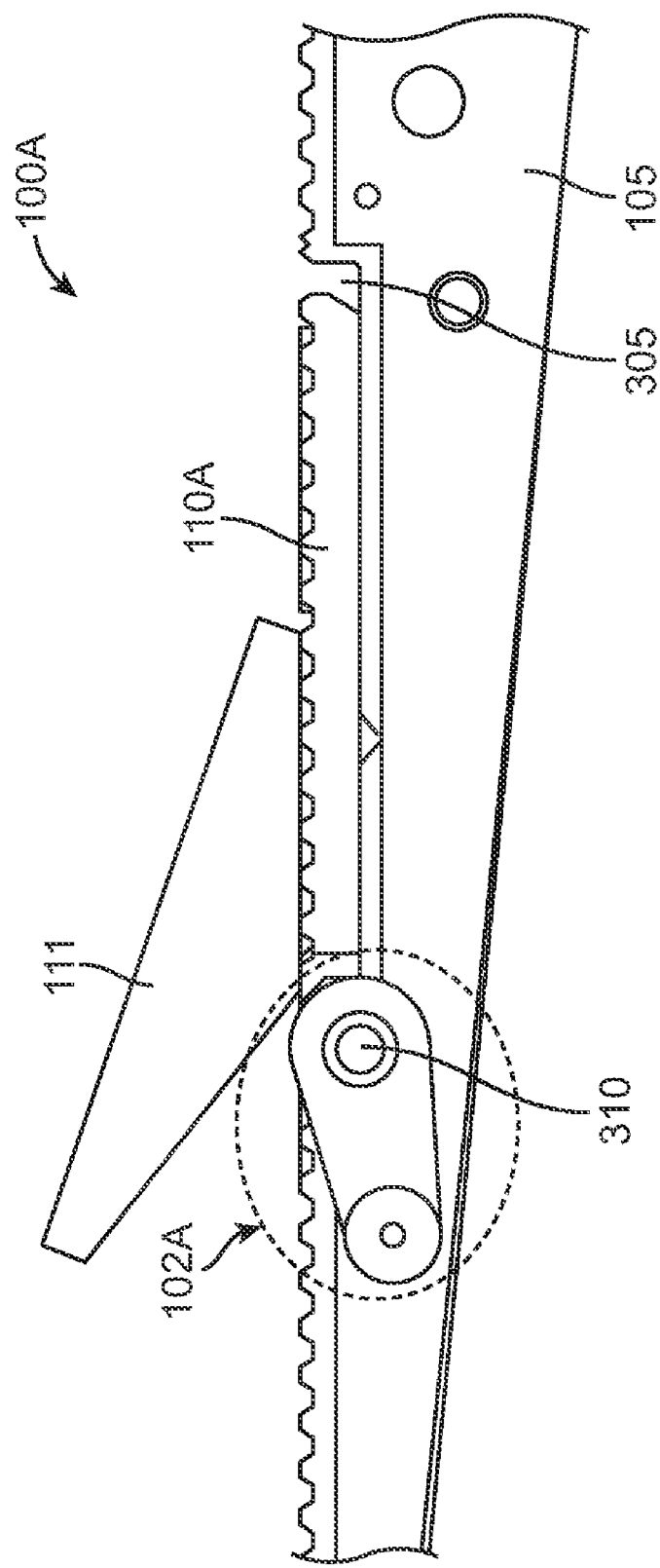
FIG. 6 illustrates a lift platform including a cart stop system having a toe press and cart stop platform lock in a closed position, according to an embodiment of the invention.

FIGS. 4-6 illustrate a lift platform 100A including a cart stop system 101 according to another embodiment of the invention. The cart stop system 101 comprises a dual cart stop mechanism having a first cart stop platform 120A and a second cart stop platform 125. It should be noted that while two example cart stop platforms 120A and 125 are illustrated as forming an embodiment of the cart stop system 101, other embodiments of the invention may have a single cart stop platform cart stop or more than two cart stop platforms in the cart stop system. In the example shown in FIG. 4, the cart stop platforms 120A and 125 in combination span substantially the width of the lift platform 100A except for the widths of toe press 110A and 115. In other examples, the cart stop platforms can have a more limited span.

The cart stop system 101 further includes a first and second locking members/devices (hereinafter "locks") 102A and 103, corresponding to the platforms 120A and 125, respectively. The locks 102A and 103 are similar in structure and operation. In one example, the lift platform 100A has a length of about 91.44 centimeters (about three feet or 36 inches) and a width of about 190.50 centimeters (about six feet and three inches or 75 inches).

The cart stop platforms 120A and 125 are rotatably connected to a platform frame 105 via hinges, each hinge including a pin 310 (FIG. 6). Support panels (or platform sections) 107, 107A are connected to the frame 105 for supporting objects and carts on the lift platform 100A. In one example, the cart stop platforms 120A and 125 each have a thickness in the range of about 1.27 to 3.81 centimeters (about ½ inch to 1½ inches), and preferably a thickness of about 2.54 centimeters (about 1 inch.). The example lift platform 100A is capable of supporting loads in the range of about 793.79 to 1134.00 kilograms (about 1750 lbs. to 2500 lbs), preferably about 907.18 kilograms (about 2000 lbs).

As shown in FIG. 6, the first platform 120A and the second platform 125 are at least partially located in a channel 305 in the platform frame 105. The channel 305 has a height substantially the same as each of a thickness of each of the platforms 120A, 125, to receive the platforms 120A, 125 in such a way that they are substantially level with the panels 107, 107A when the platforms 120A, 125 are completely lowered into the channel 305. Platforms 120A, 125 are each separately rotatable so that first platform 120A can be open (raised) or closed (lowered) independently from second platform 125, and vice versa. In another embodiment of the invention, either of the platforms 120A and 125 may be opened and/or closed, but closing or opening one will also close or open the other.

The cart stop system further includes first and second planer toe presses 110A and 115, respectively. As shown in FIG. 4, the toe press 110A extends above an upper surface of the frame 105 when the first cart stop platform 120A is in a closed (lowered) position. Similarly, the toe press 115 extends above an upper surface of the frame 105 when the second cart stop platform 125 is in a closed (lowered) position. Each toe press is hinged on a pin 310 in the frame 105 for rotating up and down (FIG. 4).

The toe press 110A includes a stop tab 112 that extends beyond an inner edge of each toe press, and over a top surface of the cart stop platform 120A to urge the cart stop platform 120A to rotate down when the toe press is forced to rotate down towards the frame 105. The toe press 115 has a similar stop tab 112 and functions in a similar manner in relation to the cart stop platform 125.

Each of the toe presses 110A and 115 includes a rotation range limiter 111. The limiters 111 limit upward rotating motion of the toe presses 110A and 115 when corresponding cart stop platforms (i.e., platforms 120A and 125) are unlocked to rotate upward to their open positions.

The limiter 111 for a toe press has a triangular section connected to an outer edge of the toe press at a transverse angle, to function as an upward rotation limiter for the toe press when that toe press is urged away from the channel 305 by action of a spring device (e.g., 420 in FIG. 7A) on the associated cart stop platform (described further below). When a lowered cart stop platform is unlocked, said spring device rotates the cart stop platform and associated toe press upwardly away from the channel 305. The toe press limiter 111 limits rearward rotation of the toe press and associated cart stop platform when said triangular portion of the limiter 111 comes in contact with a support panel 107A (FIG. 4) adjacent to the toe press. As such, upward movement of the cart stop platforms is also limited in the open (raised up) position via the stop tabs 112 on the toe presses. The panel 107A is at the rear edge of each toe press and each cart stop platform and the panel 107 is at the front edge of each toe press and each cart stop platform.

Said triangular portion of each limiter 111 may be sized to adjust the range of rotation of each cart stop platform to the open (raised) position. The range of rotation of the cart stop platforms 120A and 125 may be e.g., from about 0° in lowered (closed) position to about 42° in raised (open position). In the open position, the height of the front edge of each cart stop platform from the panel 107 is about e.g., 6.35 centimeters (about 2.5 inches). It should be noted that said range of rotation and height are adjustable in other embodiments of the invention.

The cart stop system may be configured such that in the closed position, the cart stop platforms are essentially level with upper surfaces of support panels 107, 107A. This allows carts and other wheeled devices to roll over the support panels and the cart stop platforms in the closed position, onto the lift platform 100A (e.g., FIG. 17). In the open position, the cart stop platforms, either separately or in combination serve to prevent (block) a cart or other wheeled device from rolling off of the lift platform 100A (e.g., FIG. 18).

The lift platform 100A is suitable for use with a wide variety of lifts and lifting devices. One or more of the support panels (platform sections) 107 may be foldable. When the lift platform 100A includes foldable support panels, bumpers 422 (FIG. 7A) may be provided to prevent the cart stop platforms and/or toe press in the open position from striking another section of the platform 100A when platform 100A is folded.

FIG. 5 further shows the toe press 110A in the raised/open position, with the cart stop lock 102A in the locked position holding down the cart stop platform 120A. The toe press 110A may be spring loaded to rotate to the raised position independent of the associated cart stop platform 120A. FIG. 5 further shows the toe press 115 in the lowered/closed position, with the cart stop lock 103 in the locked position holding down the cart stop platform 120A. The toe press 115 may be spring loaded to rotate to the raised position independent of the associated cart stop platform 125.

FIG. 6 shows a side view of the platform 100A including the toe press 110A and cart stop lock 102A in a closed position, wherein the toe press 110A and cart stop platform 120A may rotate about a pin or hinge 310 together and/or independently. A similar rotation mechanism is used for the toe press 115, associated cart stop lock 103 and cart stop platform 125.

Figure 7A:
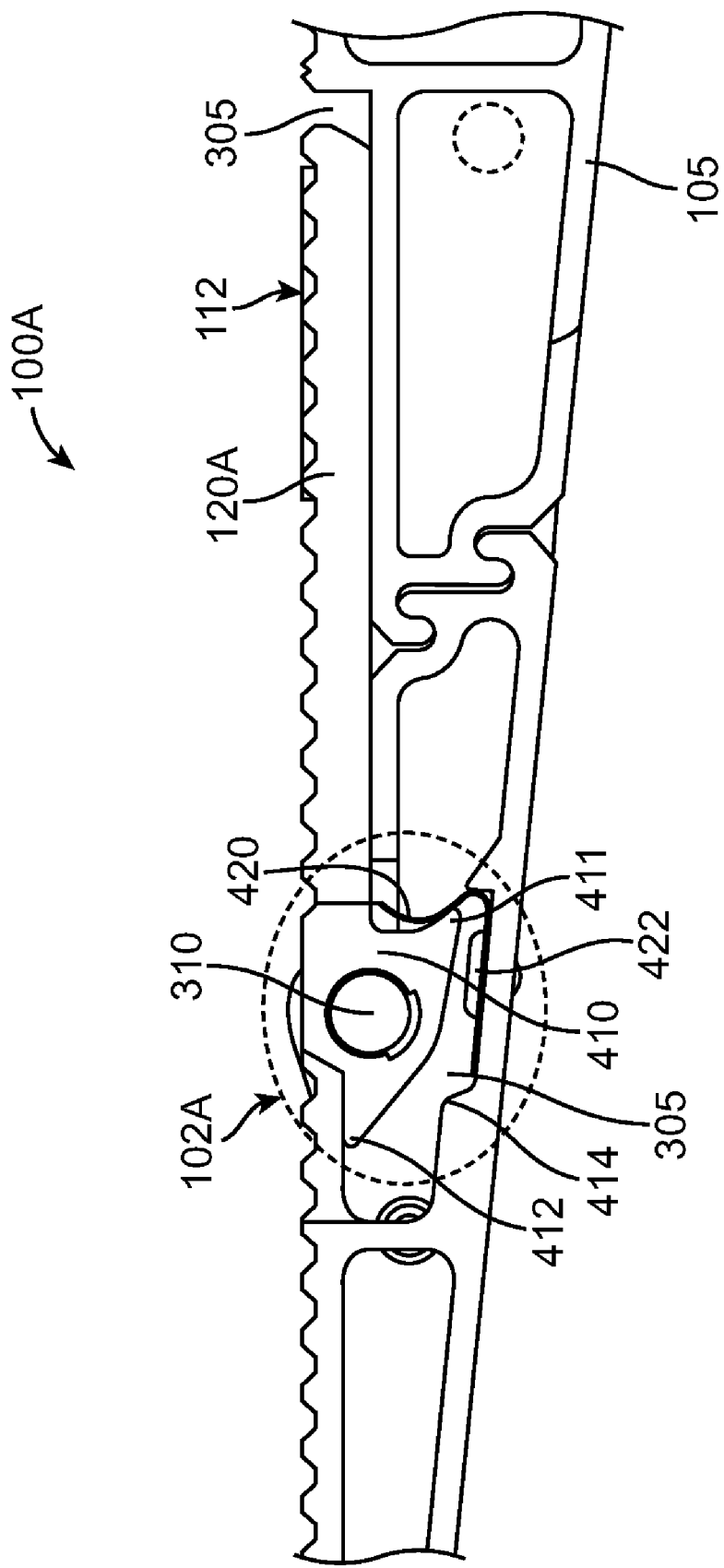

FIG. 7A illustrates a sectional view of the cart stop lock 102A and cart stop platform in a locked position corresponding to FIG. 6 (a portion of toe press 110A is not shown in FIG. 7A for clarity). The cart stop lock 103 is similar to the cart stop lock 102A. The cart stop lock 102A comprises a spring device 420 positioned at the bottom of channel 305. The spring device 420 is generally L-shaped with a hump or curved riser transverse to the bottom of the channel 305. In the locked position of the lock 102A shown in FIG. 7A, the spring device 420 is in contact with a cam 410 connected to the lower edge cart stop platform 120A, wherein the cam 410 rotates about the pin 310.

When the toe press 110A is forced to rotate down, the stop tab 112 urges against the top of the cart stop platform 120A to rotate down the platform 120A and by extension rotate the cam 410 about the pin 310. When the cart stop platform 120A is rotated into the channel 305, a first portion 411 of the cam 410 is wedged against the spring device 420, creating torque on the first cam portion 411 (any by extension the cart stop platform 120A) to keep the platform 120A in a closed (lowered) position in the channel 305 (FIG. 7A).

Operation of the spring device 420 is further described in relation to FIG. 7B which shows a sectional view of the frame 105 illustrating the platform 120A rotated from raised position (solid lines) to lowered position (dashed lines). In the raised position of the platform 120A, the spring device 420 is in configuration 420A with the first cam portion 411 supported atop spring 420 (lock 102A unlocked). Then as the platform 120A is rotated down, the spring 420 transitions in shape from 420A to deformed shapes 420B and 420C by clockwise rotating action of first cam portion 411 against riser of the spring device 420 where the platform 120A is further and further lowered, until the first cam portion 411 passes over the hump in the rise of the spring 420. Then the spring device 420 assumes shape 420A again with the first cam portion 411 wedged against the spring device 420 (lock 102A locked). The platform 120A is held down in the channel in this lowered position.

As such, either when a cart of sufficient weight rolls over the raised (lock 102A unlocked) platform 120A or the toe press is urged against the platform 120A, the platform 120A is lowered into the channel 305 and the cam 410 is wedged against the spring 420 (lock 102A locked), wherein the cart stop platform 120A is maintained in a lowered position by the spring 420.

When the cart stop platform 120A is manually raised by pulling on a section or edge of it, the cam 410 rotates upward counterclockwise and the first cam portion 411 passes over the hump of the spring device 420 into an unlocked position of the lock 102A. In this unlocked position, the force of the spring device 420 pushes on the cam 410 and creates torque to keep the cart stop platform 120A in the open/raised position with a second cam portion 412 coming to rest substantially close or in contact with a stop 414 (FIG. 7B). The operation of the second cam portion 412 and the stop 414 provides a way of limiting upward rotation of the platform 120A to a desired angle (e.g., about 42 degrees). The cart stop platforms 120A and 125 move from open to closed positions (and vice versa) by rotation about the pin 310 in the frame 105.

Figure 8:
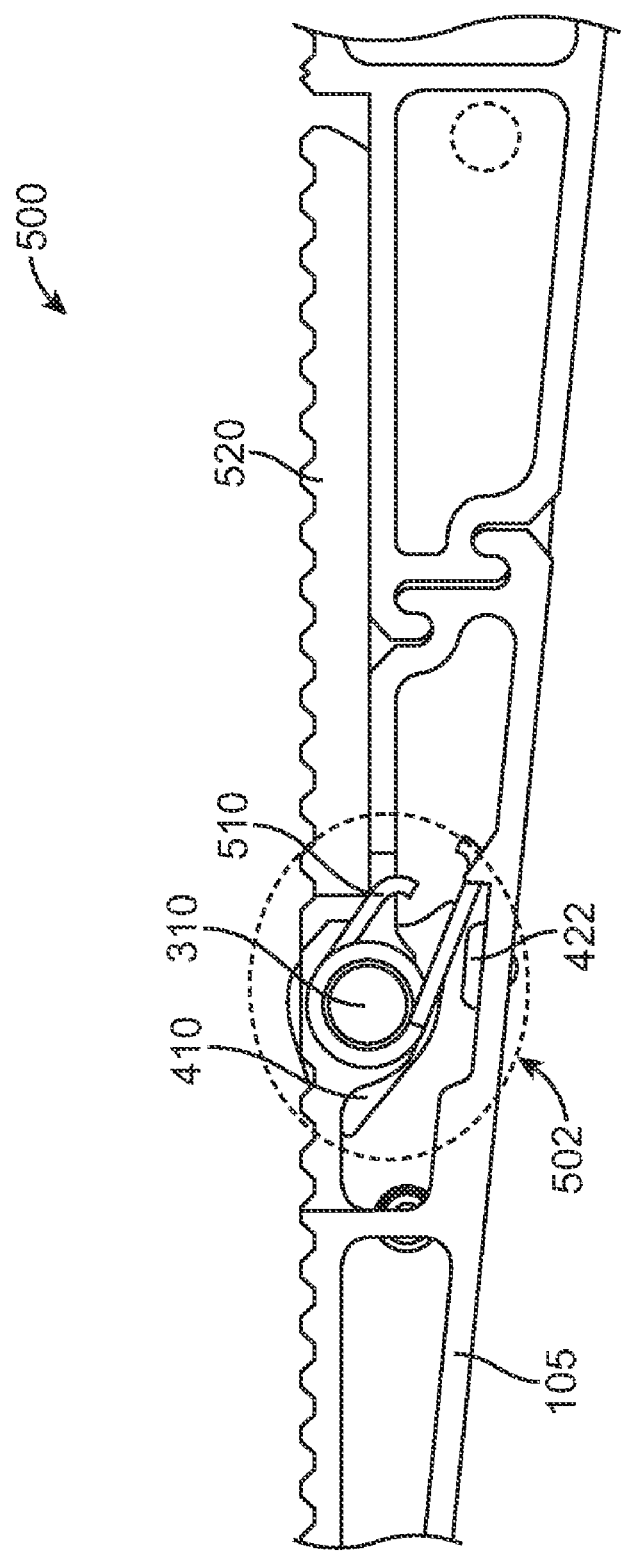
FIG. 8 illustrates a cart stop platform system according to an embodiment of the invention, illustrating a sectional view of a lock for a toe press in a closed position with a cart stop platform pressed down.
Figure 9:
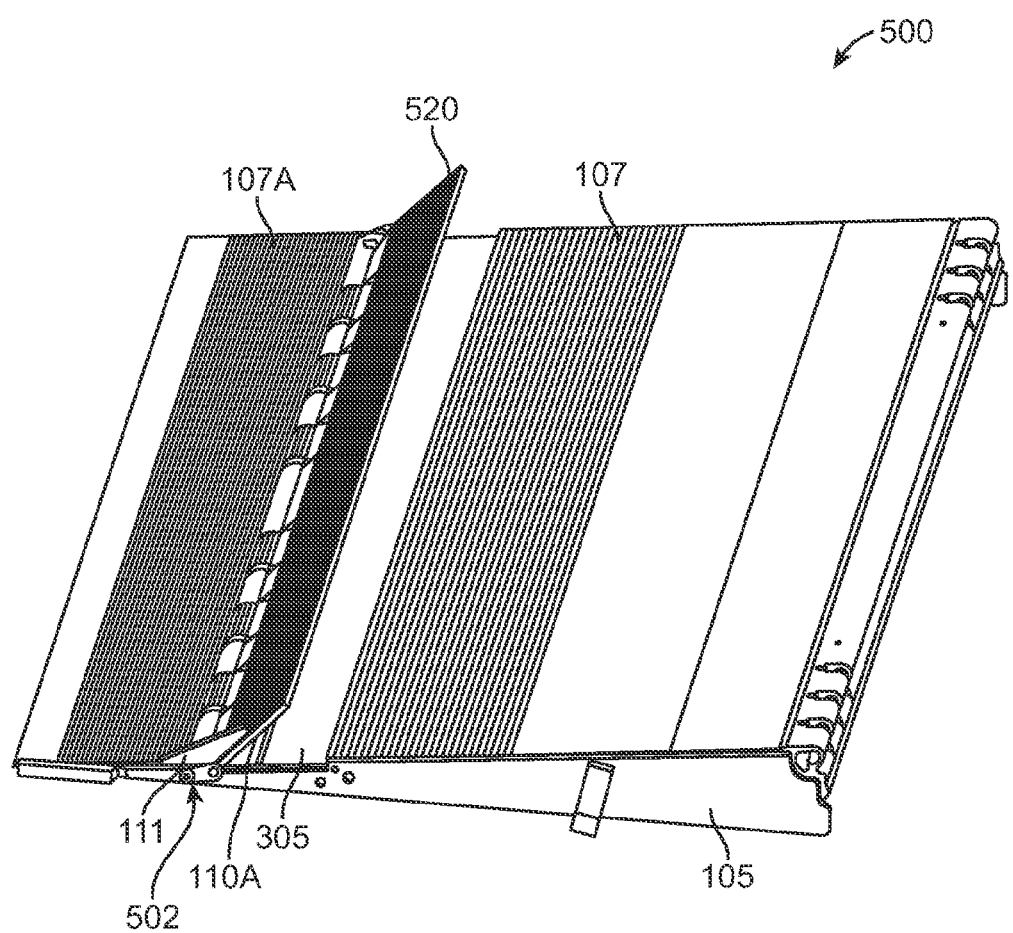
FIG. 9 illustrates a perspective view of a cart stop platform in an open (raised) position, according to an embodiment of the invention.
Figure 11:
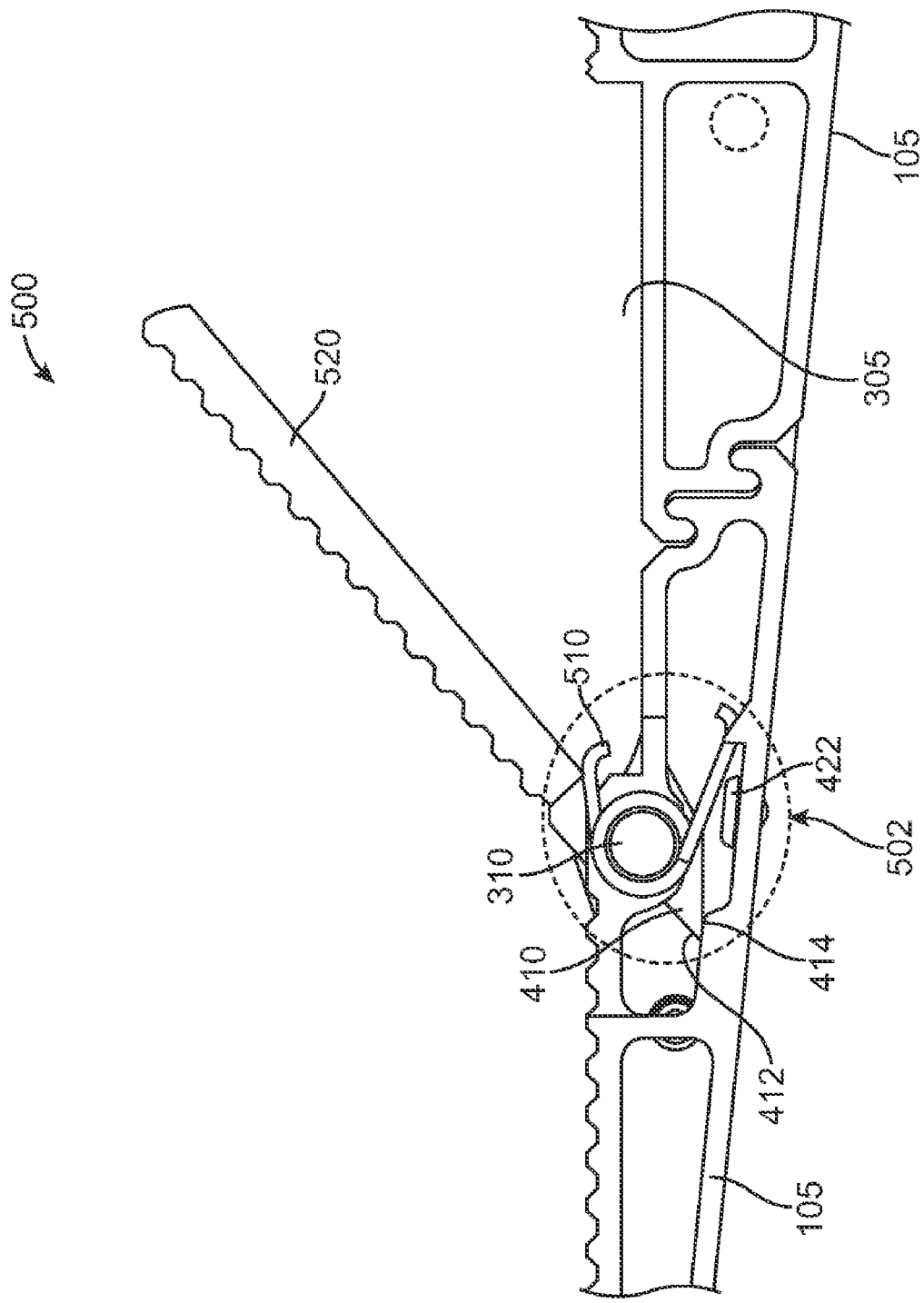
FIG. 11 illustrates a sectional view of a cart stop platform spring with the cart stop platform open, according to an embodiment of the invention.

FIGS. 8 and 9 illustrate sectional and perspective views of a lift platform 500 according to another embodiment of the invention. The lift platform 500 includes a single cart stop platform 520 with a toe press 110A and limiter 111. The lift platform 500 further includes a toe press lock 502 for locking down the toe press 110A and cart stop platform 520. FIG. 8 shows the lock 502 locked and the cart stop platform 520 in a closed (lowered into channel 305) position, and FIG. 9 shows the lock 502 unlocked and the cart stop platform 520 in an open position (the open position is also shown in FIG. 11, described in more detail further below).

The cart stop platform 520 moves from open to closed positions (and vice versa) by rotation about a pin 310 in the frame 105. A spring device 510 (e.g., coil spring around the pin 310) may be compressed by a downward force that rotates the cart stop platform 520 about the pin 310 from open to the closed position as shown in FIG. 8. It should be noted that while spring device 510 is illustrated as a coil spring, other spring devices may be used.

In this example, one extruding end of the coil spring 510 rests against the bottom of the channel 305, and another end of the spring 510 rests against lower surface of the lower edge of the platform 520. As such, when the platform 520 is rotated down from a raised position into the channel 305 by application of a downforce on the upper surface of the platform 520 (either directly or via the toe press 110A), the spring device 510 is compressed. When that downforce is removed, the expanding action of the spring 510 forces the cart stop platform 520 into its raised (open) position. In one example of the spring device 510, a weight in the range of about 1.36 to 3.40 kilograms (about 3-7.5 lbs.), and preferably about 2.27 kilograms (about 5 lbs.), is necessary to force the cart stop platform 520 to a closed position into the channel 305. When that weight is removed from the cart stop platform 520, the spring device 510 rotates the cart stop platform 520 back to an open position.

Since the cart stop platform 520 is spring loaded by the spring 510, it tends to return to an open (raised) position (FIG. 9) unless held down by a force. For example, when the toe press lock 502 is unlocked, as cart wheels roll over the cart stop platform 520, the platform 520 is rotated down into the channel 305 into its closed (lowered) position allowing the cart wheels to roll onto the lift platform 520 (e.g., FIG. 17). Then when the cart wheels roll off the platform 520, the platform 520 rotates back up to its open position by the expanding (decompressing) action of the spring 510.

Figure 10A:
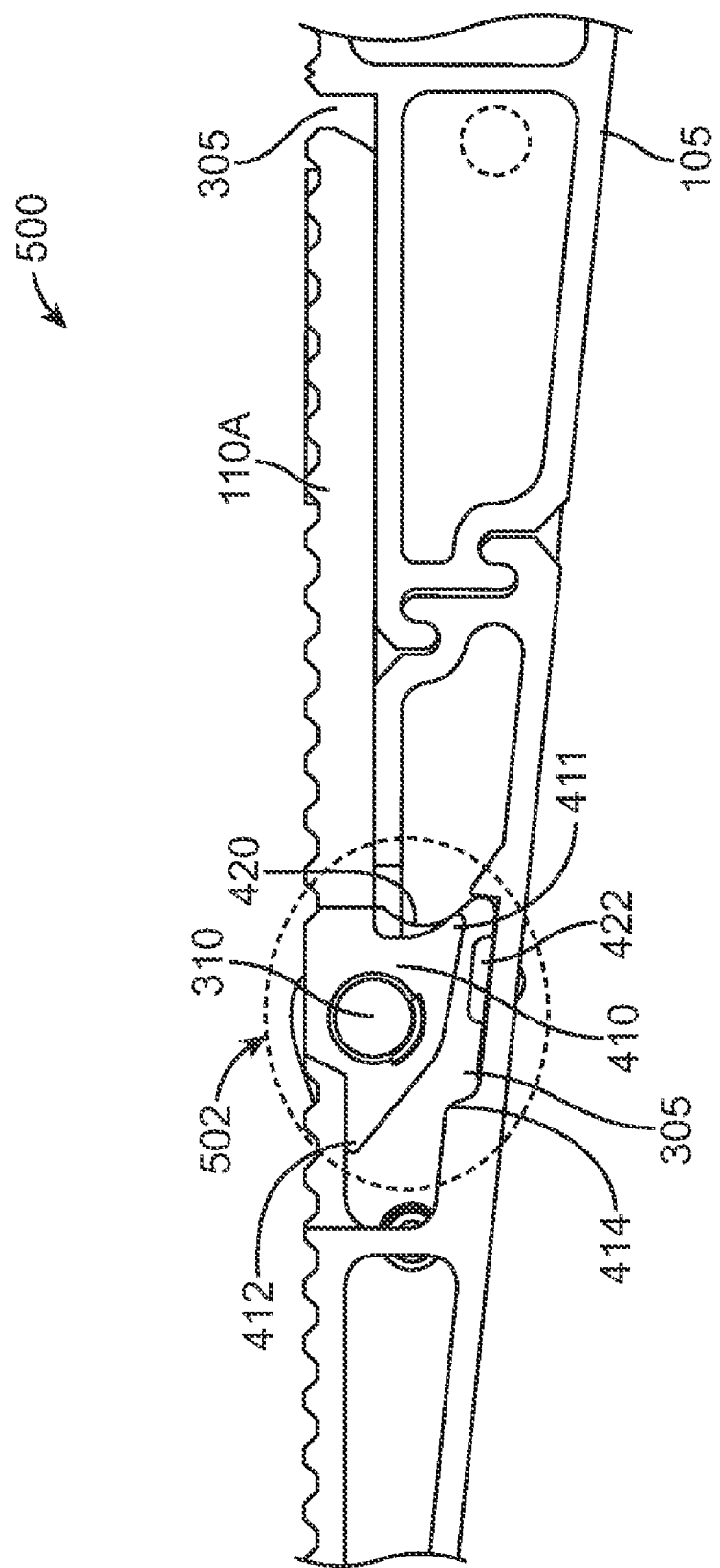
FIG. 10A illustrates a sectional view of a cart stop platform lock implemented as a toe press lock in a locked (lowered) position with the cart stop platform open, according to an embodiment of the invention.

The cart stop platform 520 can be locked down in the lowered position by the lock 502 which operates to maintain the toe press 110A locked down, whereby the stop tab 112 of the toe press 110A holds the platform 520 in the channel 305. As shown in FIG. 10A, in one example the lock 502 is a component of the toe press 110A, including a cam 410 and L-shaped spring device 420 with a hump. The cam 410 and L-shaped spring device 420 operate in a similar fashion as described in FIGS. 7A-B for locking down the cart stop platform 120A, except that in the embodiment shown in FIG. 10A, the cam 410 and spring device 420 of the lock 502 are components of the toe press 110A which operate directly on the toe press 110A (i.e., the cam 410 is connected to a lower edge of the toe press 110A and rotates about the pin 310 in the frame 105).

In this embodiment, the spring device 420 and the spring device 510 are selected such that in the locked position of the lock 502 (where the platform 520 is held down in the channel 305), the spring device 420 exerts more force on the cam 410 to maintain the toe press 110A (and by extension the platform 520) in the lowered position, than the force the compressed spring device 510 exerts to raise the platform 520 out of the channel 305 (i.e., torque from spring device 420 to hold down the toe press 110A is greater than torque from spring 510 to raise the platform 520).

The spring devices 420 and 510 may be made of steel, aluminum, or any other suitable material, such as a metal or metal alloy. The spring devices can be modified to uncompress with more force on the cart stop platforms according to the weight and length of the cart stop platforms such that the spring devices are capable of raising the cart stop platform to the opened or fully raised position.

Figure 10B:
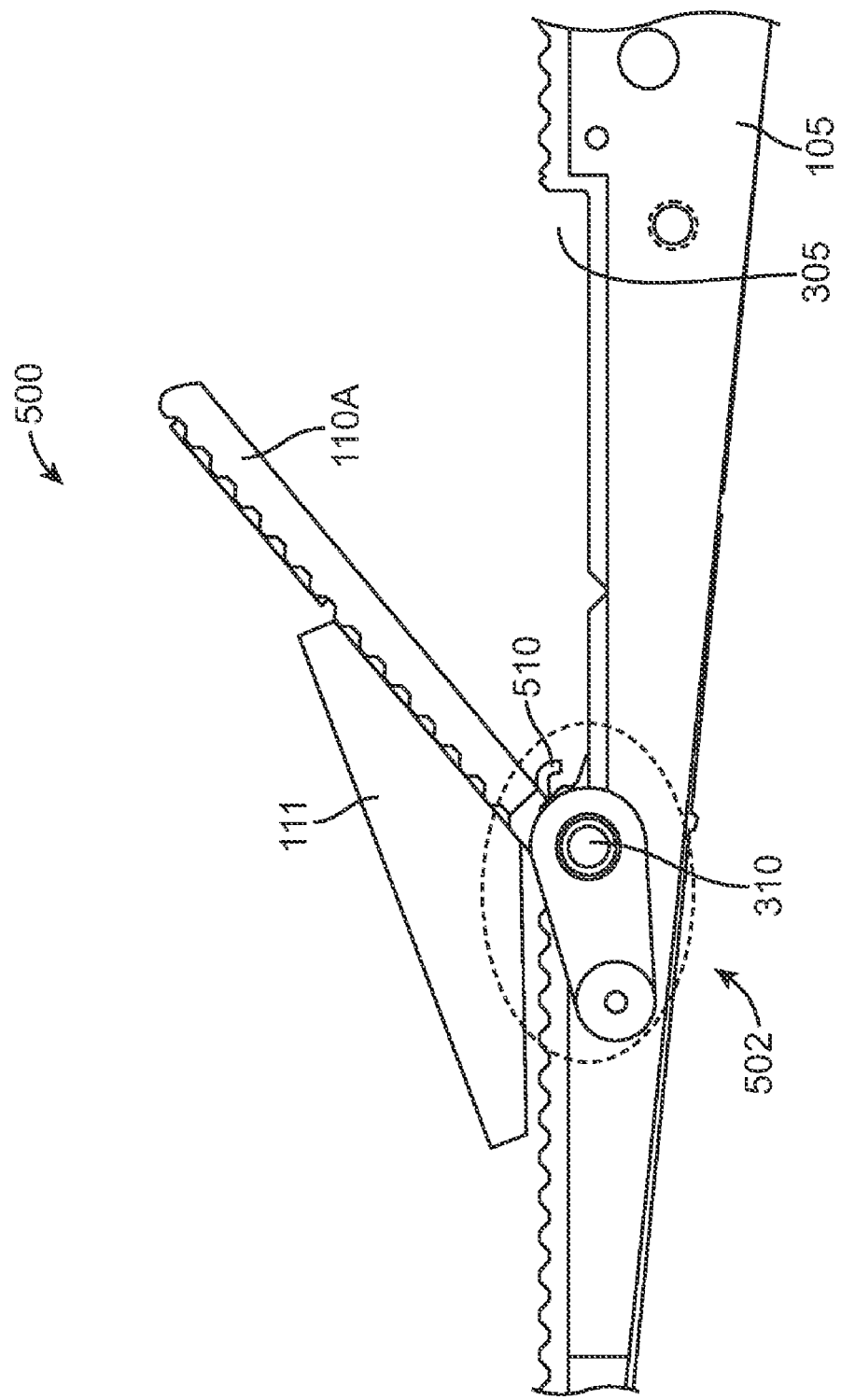
FIG. 10B illustrates a sectional isolated view of a cart stop platform lock implemented as a toe press lock in an unlocked (raised) position with the cart stop platform closed, according to an embodiment of the invention.

The lock 502 may be unlocked by manually pulling up on the toe press 110A (or the platform 520) to release the cam portion 411 wedged against the spring device 420, allowing the spring 510 to push up and rotate the platform 520 to the open position. FIG. 10B illustrates the toe press 110A (and platform 520) in a raised position and the lock 502 unlocked, wherein the spring device 510 is uncompressed. FIG. 11 shows a sectional view of the frame 105, illustrating the cart stop platform 520 raised (opened) by uncompressing force of the spring 510. FIG. 11 also shows the cam 410 in the unlocked position (planar portion of the toe press 110A is not shown in FIG. 11).

Figure 12:
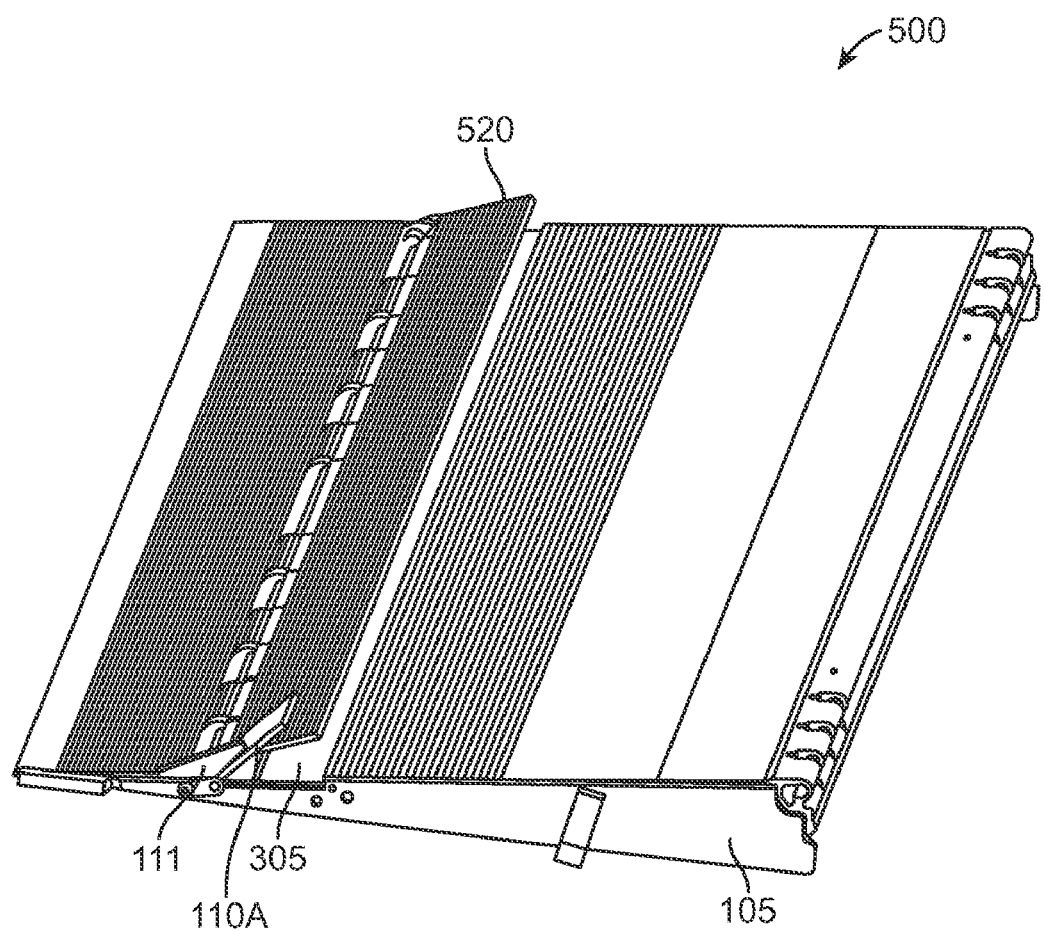
FIG. 12 illustrates a perspective view of an unlocked cart stop platform half open, according to an embodiment of the invention.
Figure 13:
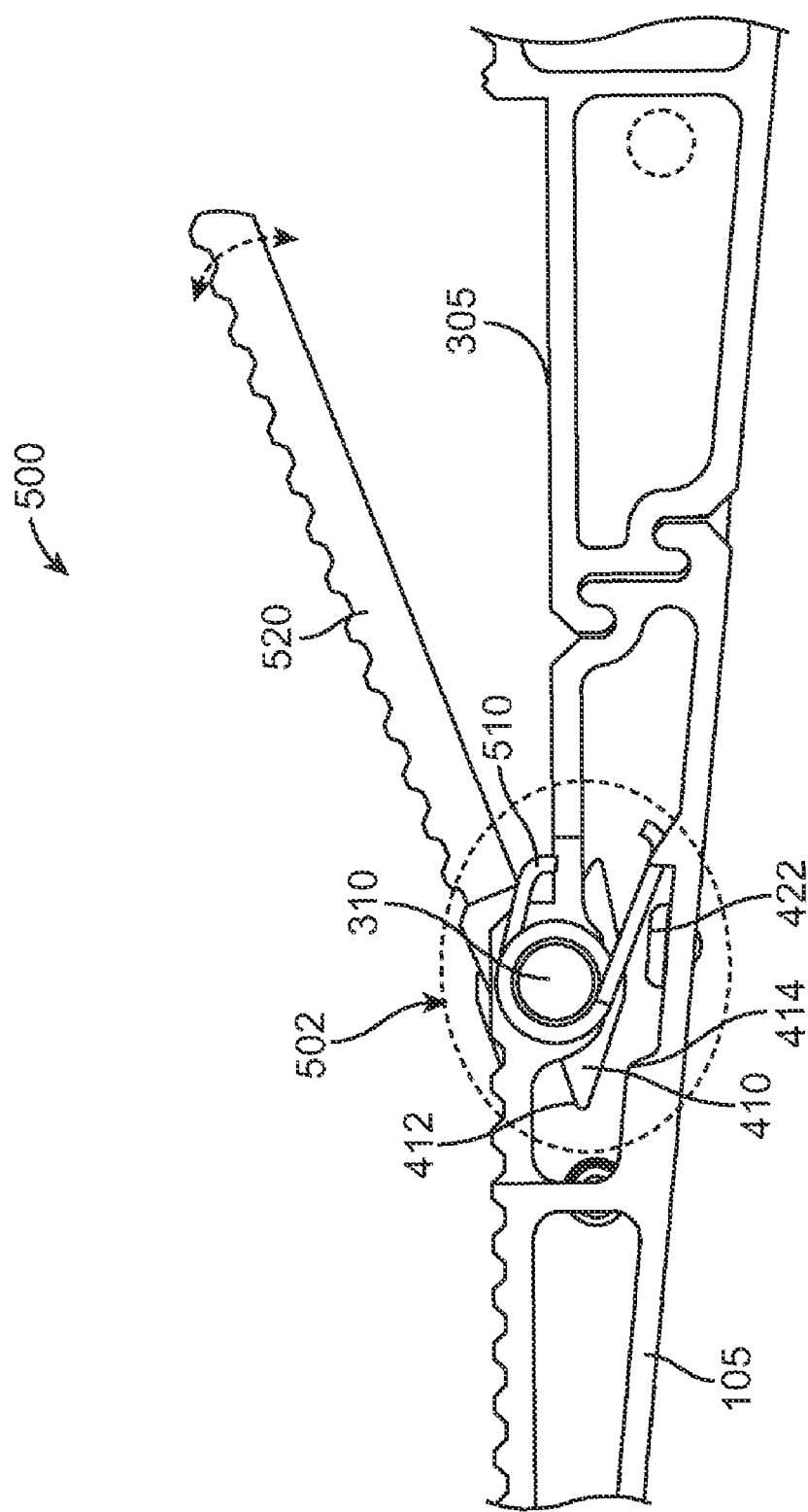
FIG. 13 illustrates a sectional view of an unlocked cart stop platform half open, according to an embodiment of the invention.
Figure 14:
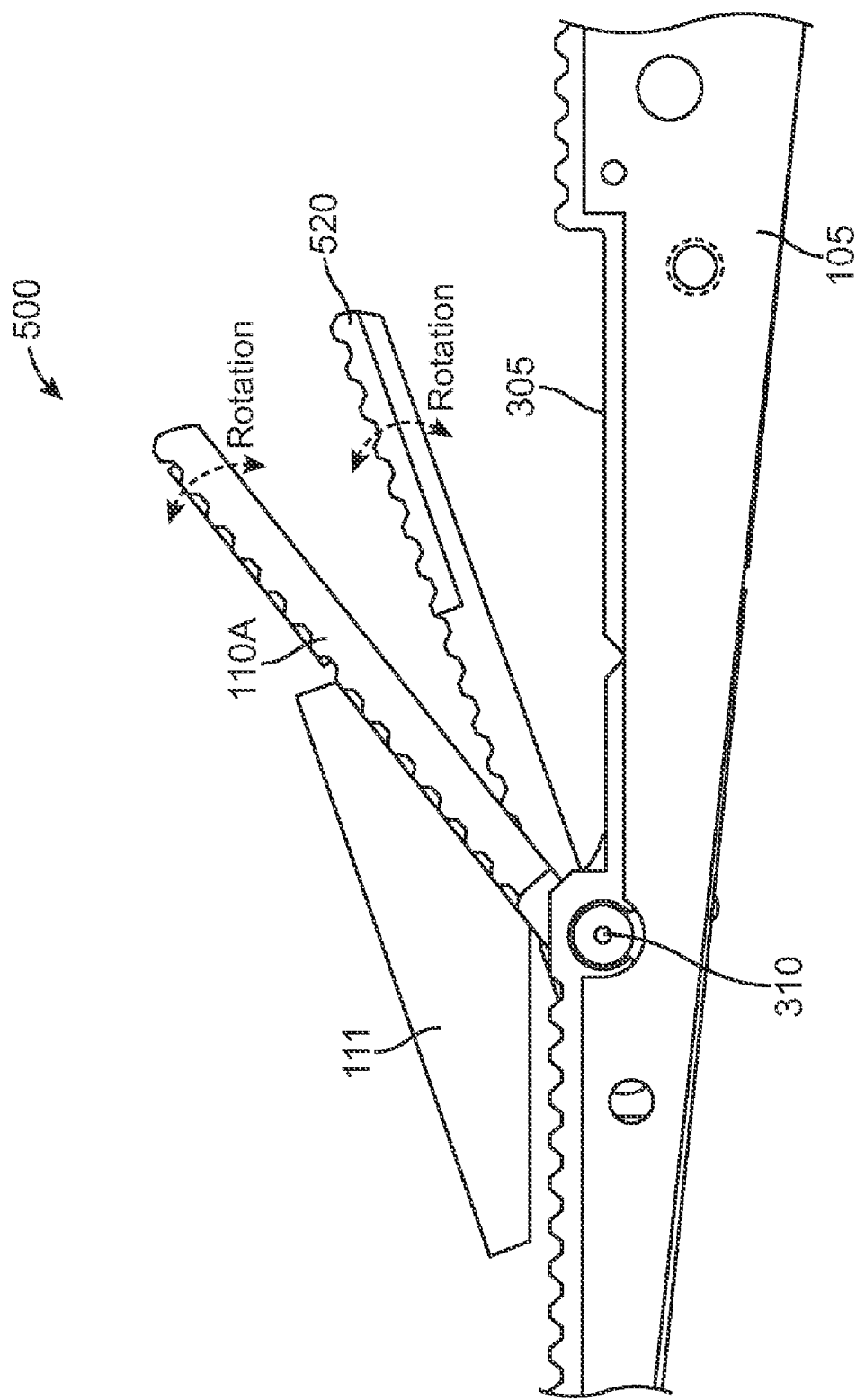
FIG. 14 illustrates a side view of an unlocked toe press with the cart stop platform rotating upwards, according to an embodiment of the invention.

FIG. 12 illustrates the platform 500 with the cart stop platform 520 in a half-raised position, with the toe press 110A in a raised or unlocked position. As the cart stop platform 520 is half-raised, this indicates a state when either a downforce is being applied to the cart stop platform 520 or the downforce is being removed from the platform 520 (i.e., the cart stop platform 520 is in transition, either being raised or lowered). FIG. 13 illustrates a sectional view of the frame 105 showing cam 410 of the lock 502, with the lock 502 in an open position allowing the cart stop platform 520 half open (i.e., in between being raised or lowered). FIG. 14 illustrates a side view of both the toe press 110A and platform 520, wherein the lock 502 is unlocked, with the stop platform 520 moving either to a raised position or to a closed position.

Figure 15:
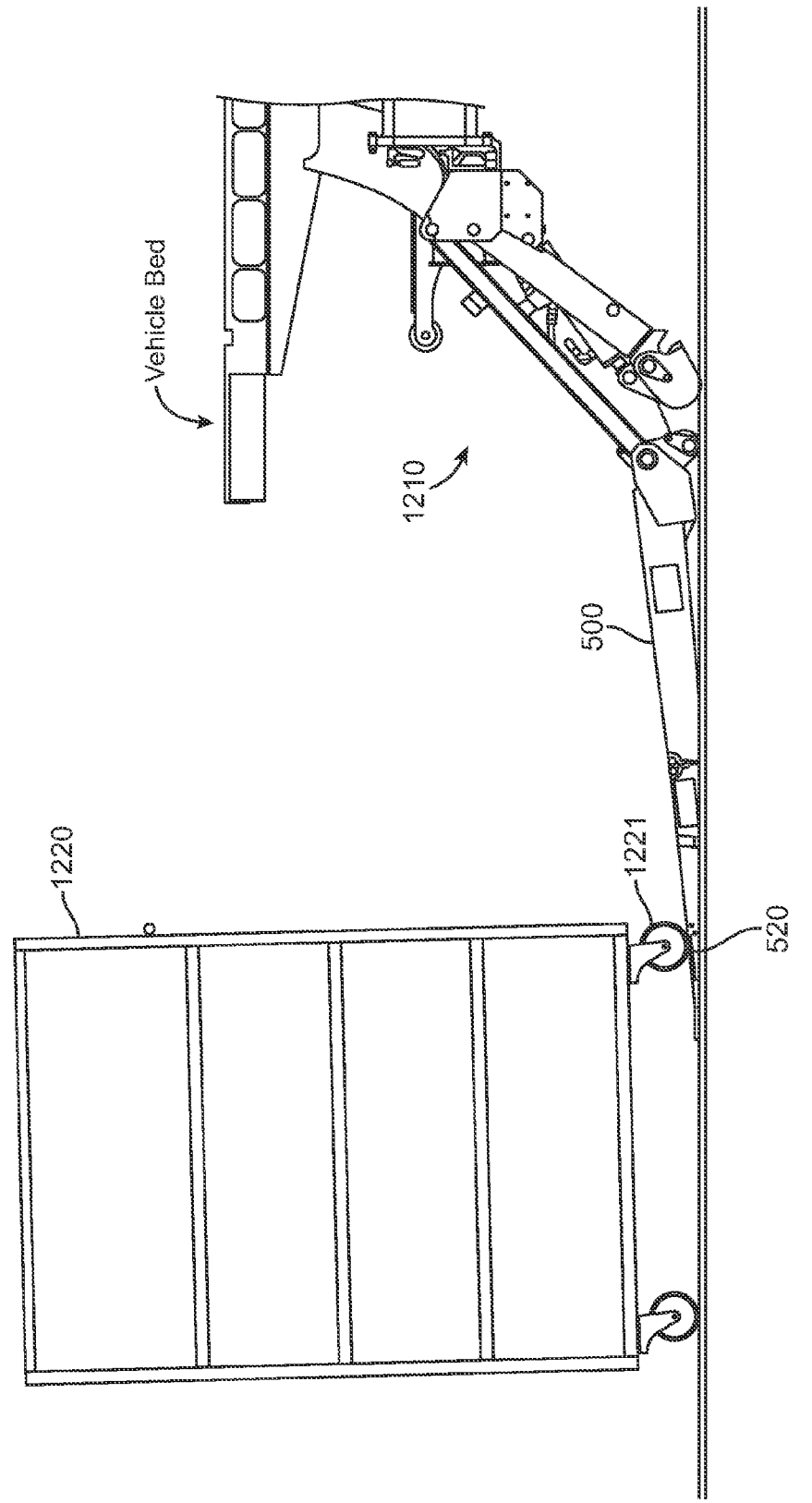
FIG. 15 illustrates a side view of a lift platform connected to a vehicle lift with a cart rolling over the cart lift platform including a cart stop system, according to an embodiment of the invention.
Figure 16:
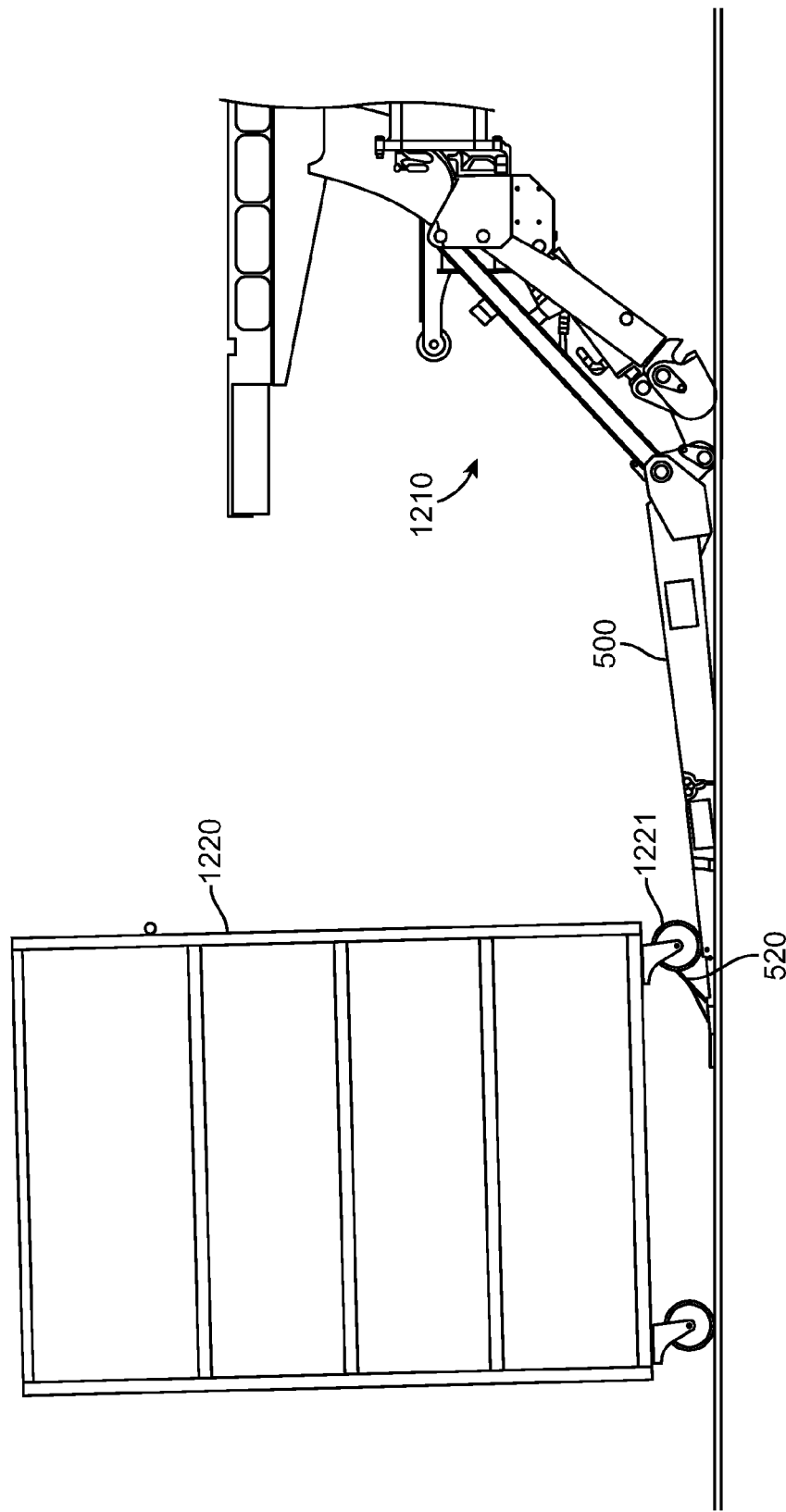
FIG. 16 illustrates a sectional view of a lift platform connected to a vehicle lift with a cart shown rolled over the cart lift platform including a cart stop system, according to an embodiment of the invention.

FIG. 15 illustrates said lift platform 500 connected to a lift system 1210 that is attached to a vehicle. As illustrated lift platform 500 is shown in a "down" position on a surface, such as the ground or a loading platform. A cart 1220 has been placed onto the lift platform 500 and the cart stop platform 520 is in a closed position due to the force from the weight of the cart 1220 having its wheels 1221 rolling over the cart stop platform 520. FIG. 16 illustrates the cart 1220 now being moved completely over the cart stop platform 520, where the force from the weight of the cart 1220 is removed from the cart stop platform 520. This causes the cart stop platform 520 to rotate from the closed position to the open position. In the open position, the cart stop platform 520 prevents the wheels 1221 from rolling backwards on the lift platform 500 and prevents the cart 1220 from rolling off the lift platform 500, which can be helpful on a sloped surface where the cart 1220 is not allowed to continue rolling off the lift platform 500.

Figure 17:
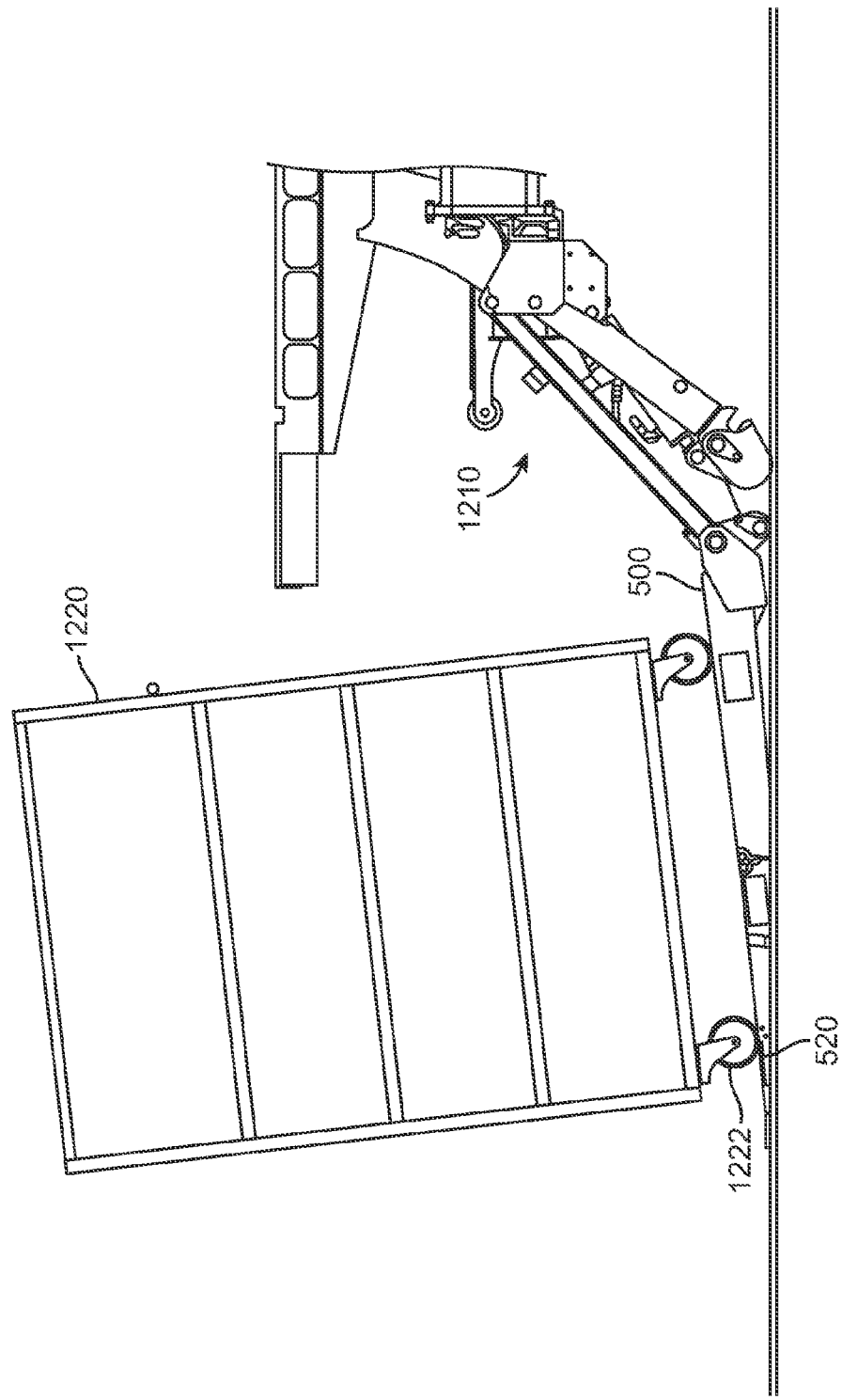
FIG. 17 illustrates a sectional view of a lift platform connected to a vehicle lift with a cart rolled onto the cart lift platform including a cart stop system, according to an embodiment of the invention.
Figure 18:
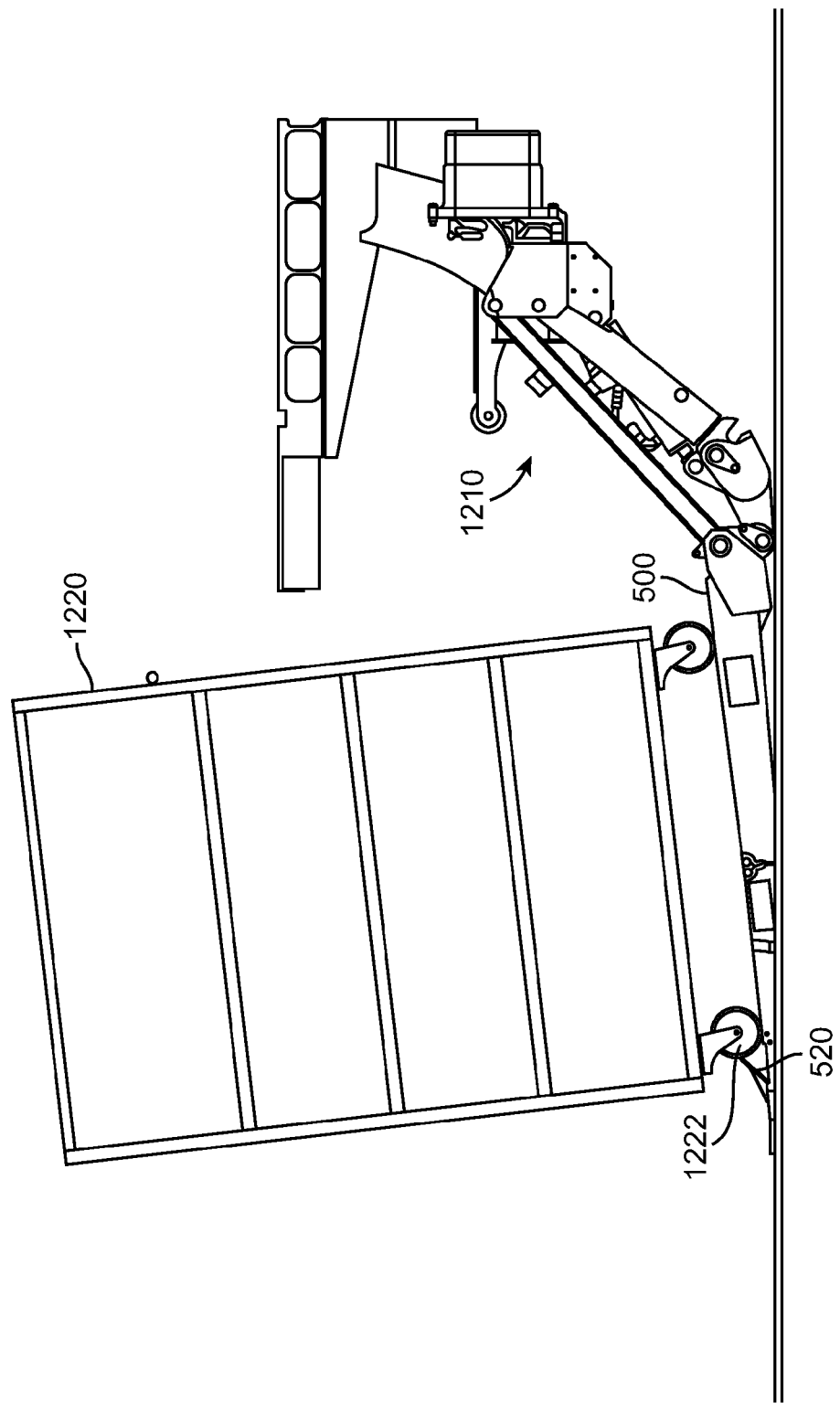
FIG. 18 illustrates a sectional view of a lift platform connected to a vehicle lift with a cart stopped by a cart stop platform including a cart stop system, according to an embodiment of the invention.

FIG. 17 illustrates the cart 1220 being moved completely onto the lift platform 500 with rear wheels 1222 rolling over the cart stop platform 520. FIG. 18 illustrates the cart 1220 having the rear wheels 1222 moved off of the cart stop platform 520, which removes the force from the cart stop platform 520 and raises the cart stop platform 520 to the open position. This stops the cart 1220 from being able to roll off the lift platform 500.

Figure 19:
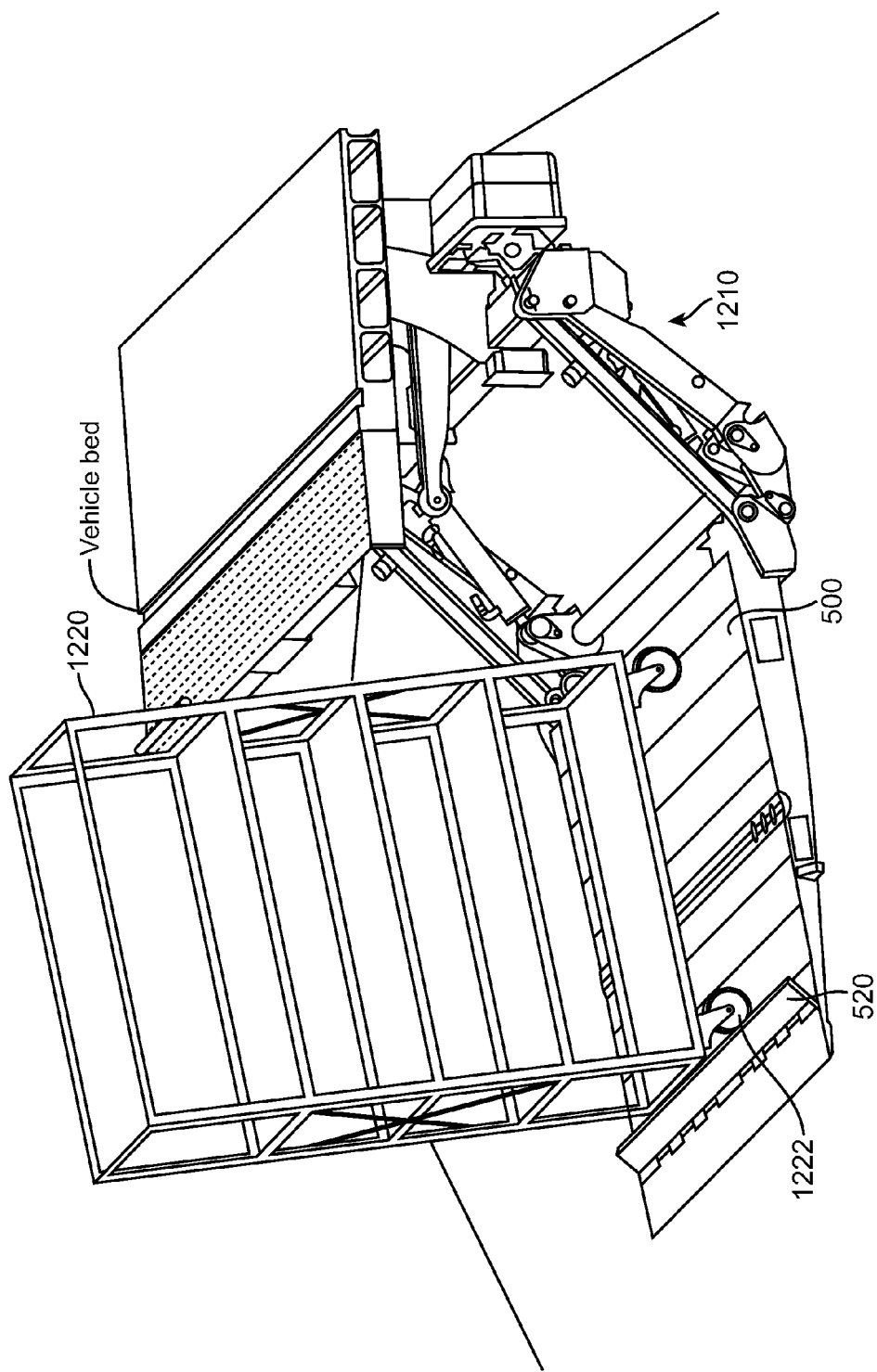
FIG. 19 illustrates a perspective view of a lift platform shown in a lowered position that is connected to a vehicle lift with a cart stopped by a cart stop platform including a cart stop system, according to an embodiment of the invention.
Figure 20:
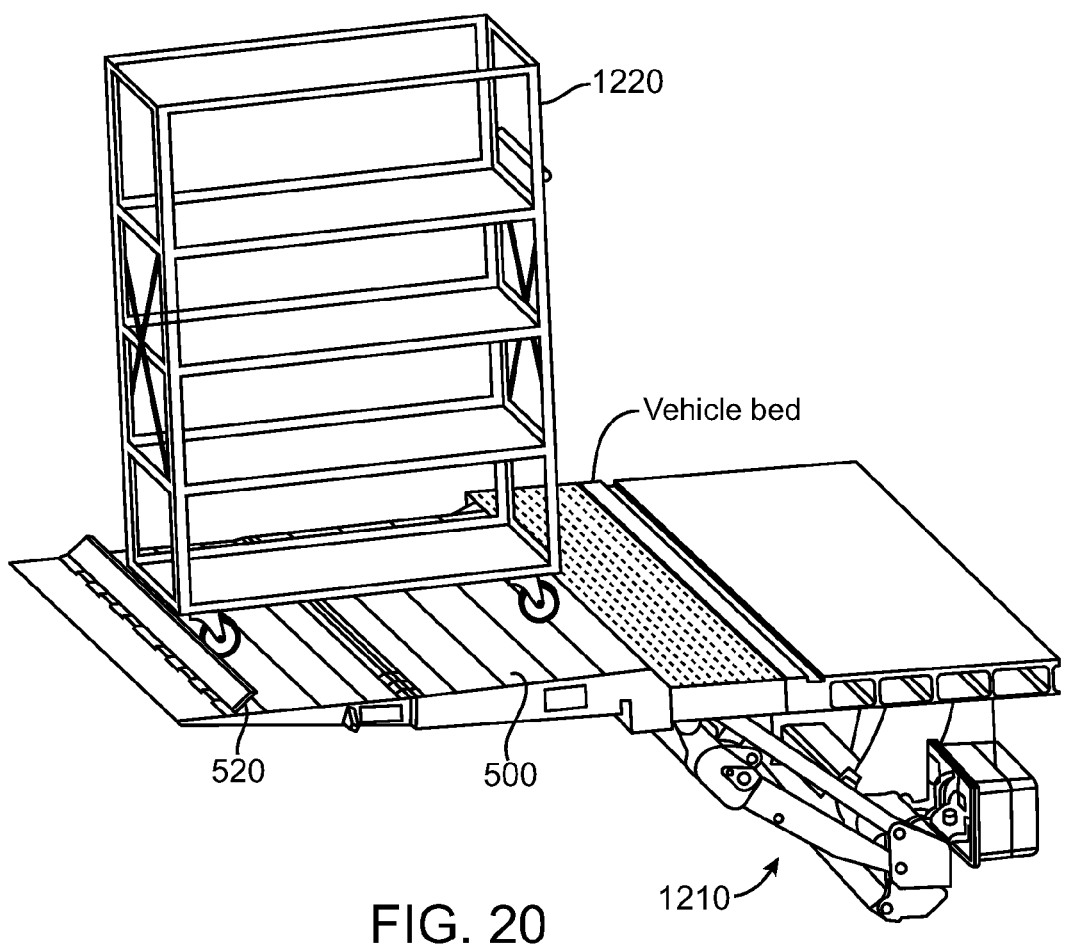
FIG. 20 illustrates a perspective view of a lift platform shown in a raised position that is connected to a vehicle lift with a cart stopped by a cart stop platform including a cart stop system, according to an embodiment of the invention.

FIG. 19 illustrates a perspective view of the lift platform 500 connected to a vehicle lift 1210. As illustrated, the cart 1220 is completely moved onto the lift platform 500 and is stopped from rolling off by the cart stop platform 520 stopping the rear wheels 1222. As illustrated, the lift platform 500 is in a down position and is in contact with a surface, such as the ground or a loading platform. FIG. 20 illustrates the lift platform 500 in a raised position after being lifted by the vehicle lift 1210. As illustrated, the cart stop platform 520 prevents the cart 1220 from rolling off the lift platform 500 while the lift platform 500 is raised.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other modifications may occur to those ordinarily skilled in the art.

What is claimed is:

1. A cart stop system for a lift platform having an upper load bearing surface, the cart stop system comprising:
a moveable cart stop platform section; and
a first locking member including a cam member, the locking member configured to engage and hold down the moveable cart stop platform section in a closed position, and to release the moveable cart stop platform section to raise to an open position;
the locking member further including a first spring device positioned in contact with the cam member such that the first spring device biases against the cam member when the moveable cart stop platform section is moved towards the closed position by a downforce;
such that unless a downforce greater than a specified magnitude is applied to the moveable cart stop platform section to lower the moveable cart stop platform section, the moveable cart stop platform section remains in the open position;
wherein in the open position the moveable cart stop platform section blocks cart wheels from rolling over the moveable cart stop platform section and off said upper surface of the lift platform;
wherein in the closed position the moveable cart stop platform section is substantially level with an upper surface of the lift platform to allow cart wheels to roll over the moveable cart stop platform section and off said upper surface of the lift platform;
wherein the cam member is connected to a lower edge of the moveable cart stop platform section; and
wherein the spring device is configured such that upon the moveable cart stop platform section being positioned in the closed position, the spring device is biased against a portion of the cam member to lock the locking member and maintain the moveable cart stop platform section in the closed position.

2. The cart stop system of claim 1, wherein the moveable cart stop platform section comprises a first moveable platform portion and a second moveable platform portion.

3. The cart stop system of claim 2, wherein the first moveable platform portion and the second moveable platform portion are separately moveable.

4. The cart stop system of claim 2, further comprising a second locking member, wherein the first locking member is configured to hold down the first moveable platform portion and the second locking member is configured to hold down the second moveable platform portion.

5. The cart stop system of claim 1, wherein the spring device is further configured to raise the moveable cart stop platform section from a closed position to an open position when the locking member is unlocked.

6. The cart stop system of claim 5, further comprising a moveable toe press member having a tab for engaging the moveable cart stop platform section to allow the moveable cart stop platform section to be moved from an open position to a closed position when a downward force is exerted on the toe press member, wherein in the closed position of the locking member the spring device is biased against a portion of the cam member to maintain the moveable cart stop platform section in the closed position.

7. The cart stop system of claim 1, wherein:
the first spring device has a substantially L-shaped profile including a hump;
such that the hump of the first spring device engages a recess of the cam member to lock the locking member, and exerts a force against the recess of the cam member when the locking member is locked.

8. The cart stop system of claim 7, wherein a first portion of the cam member rotates against, and eventually passes over, the hump of the spring device as the moveable cart stop platform section is raised to an open position, said rotating action of the first portion of the cam member deforming the hump of the spring device to disengage the hump of the spring device from the recess of the cam member and unlock the locking member.

9. The cart stop system of claim 7, wherein:
said hump engages a recess of the cam member to lock the locking member, and the hump exerts a force against the recess of the cam member when the locking member is locked.

10. The cart stop system of claim 9, wherein the hump exerts a force against the recess of the cam member when the locking member is locked such that said force has a direction substantially parallel to a horizontal plane of the moveable cart stop platform section to maintain the cart stop platform section in the closed position.

11. The cart stop system of claim 1, wherein:
the first spring device has a substantially L-shaped profile that engages the cam member.

12. The cart stop system of claim 1, wherein:
the first spring device rotatably biases against the cam member when the moveable cart stop platform section is moved towards the closed position by a downforce applied to the moveable cart stop platform section.

13. A cart stop system for a lift platform having an upper load bearing surface, the cart stop system comprising:
a moveable cart stop platform section;
a moveable toe press extension having a tab for engaging the moveable cart stop platform section to allow the moveable cart stop platform section to be rotated from an open position to a closed position by a downward force exerted on the toe press extension;
a first locking member comprising a cam member and a first spring device positioned in contact with the cam member such that the first spring device biases against the cam member, wherein the cam member is connected to a lower edge of the toe press extension such that when the locking member is locked the first spring device is biased against a portion of the cam member to maintain the toe press extension in a closed position;
a second spring device positioned to engage and raise the moveable cart stop platform section to an open position when the locking member is unlocked;
wherein when the first spring device is biased against said portion of the cam member to maintain the toe press extension in a closed position, said tab holds down the moveable cart stop platform section in the closed position despite the action of the second spring;
wherein as the toe press extension is raised to an open position by an applied force, said portion of the cam member rotates against the first spring device and deforms the spring device to disengage the first spring device from said portion of the cam member and unlock the locking member, such that the second spring device raises the moveable cart stop platform section to an open position.

14. The cart stop system of claim 13, wherein in the open position the moveable cart stop platform section blocks cart wheels from rolling over the moveable cart stop platform section and off said upper surface of the lift platform, and wherein in the closed position the moveable cart stop platform section is substantially level with an upper surface of the lift platform to allow cart wheels to roll over the moveable cart stop platform section and off said upper surface of the lift platform.

15. The cart stop system of claim 14, wherein:
with the locking member in an unlocked state and a downforce applied to the moveable cart stop platform section, the moveable cart stop platform section remains substantially level with an upper surface of the lift platform; and
the moveable cart stop platform section is raised by the second spring device upon the downforce being removed.

16. The cart stop system of claim 15, wherein:
the first spring device has a substantially L-shaped profile that engages the cam member.

17. A lift system, comprising:
a lift platform having an upper load bearing surface having a channel therein; and
a cart stop system comprising:
an essentially planar cart stop platform section rotatably connected at a lower edge to the lift platform adjacent said channel, the channel and the cart stop platform section configured wherein when the cart stop platform section is rotated from a raised position to a lowered closed position the channel receives the cart stop platform section such that an upper surface of the cart stop platform section is essentially level with said upper surface of the lift platform; and
a first locking member including a cam member, the locking member configured to hold down the cart stop platform section in a closed position, and to release the cart stop platform section to raise to an open position;
the locking member further including a first spring device positioned in contact with the cam member such that the first spring device biases against the cam member, wherein the spring device is configured such that upon the cart stop platform section being positioned in the closed position, the spring device is biased against a portion of the cam member to lock the locking member and maintain the cart stop platform section in the closed position;
such that unless a downforce greater than a specified magnitude is applied to the cart stop platform section to lower the cart stop platform section, the cart stop platform section remains in the open position;
wherein in the open position the cart stop platform section is in a raised position and blocks objects from rolling over the cart stop platform section and off an upper surface of the lift platform;
wherein in the closed position the rotatable cart stop platform section is substantially level with the upper surface of the lift platform to allow objects to roll over the cart stop platform section and off said upper surface of the lift platform.

18. The lift system of claim 17, wherein the rotatable cart stop platform section comprises a first rotatable platform and a second rotatable platform, the first rotatable platform and the second rotatable platform are configured to rotate separately.

19. The lift system of claim 18, further comprising a second locking member, wherein the first locking member is configured to hold down the first rotatable platform and the second locking member is configured to hold down and release the second rotatable platform.

20. The lift system of claim 17, wherein a second spring device is further configured to raise the cart stop platform section from a closed position to an open position when the locking member is unlocked.

21. The lift system of claim 20, further comprising a toe press member rotatably connected at an edge to the platform adjacent to the cart stop platform section, the rotatable toe press member having a tab for engaging the cart stop platform section to allow the cart stop platform section to be rotated from an open position to a closed position when a downward force is exerted on the toe press member, wherein in the closed position of the locking member the spring device is biased against a portion of the cam member to maintain the cart stop platform section in the closed position.

22. The lift system of claim 17, where the rotatable cart stop platform section has a thickness of about 2.54 centimeters.

23. The lift system of claim 17, wherein:
the first spring device rotatably biases against the cam member when the cart stop platform section is moved towards the closed position by a downforce applied to the cart stop platform section.

24. The lift system of claim 17, wherein:
a protrusion of the cam member rests against a bottom of the channel when the cart stop platform section is in the open position; and
upward rotation of the cart stop platform section is limited when the protrusion of the cam member rests against the bottom of the channel.

25. A lift system, comprising:
a lift platform having an upper load bearing surface having a channel therein; and
a cart stop system comprising:
an essentially planar cart stop platform section rotatable connected at a lower edge to the lift platform adjacent said channel, the channel and the cart stop platform section configured wherein when the cart stop platform section is rotated from a raised position to a lowered position the channel receives the cart stop platform section such that an upper surface of the cart stop platform section is essentially level with said upper surface of the lift platform;
a moveable toe press extension having a tab for engaging the moveable cart stop platform section to allow the moveable cart stop platform section to be rotated from an open position to a closed position by a downward force exerted on the toe press extension;
a first locking member comprising a cam member and a first spring device positioned in contact with the cam member such that the first spring device biases against the cam member, wherein the cam member is connected to a lower edge of the toe press extension such that when the locking member is locked the first spring device is biased against a portion of the cam member to maintain the toe press extension in a closed position;
a second spring device positioned to engage and raise the moveable cart stop platform section to an open position when the locking member is unlocked;
wherein when the first spring device is biased against said portion of the cam member to maintain the toe press extension in a closed position, said tab holds down the moveable cart stop platform section in the closed position despite the action of the second spring;
wherein as the toe press extension is raised to an open position by an applied force, said portion of the cam member rotates against the first spring device and deforms the spring device to disengage the first spring device from said portion of the cam member and unlock the locking member, such that the second spring device raises the moveable cart stop platform section to an open position.

26. The lift system of claim 25, wherein:
the toe press extension is adjacent to the cart stop platform section;
in the open position the moveable cart stop platform section blocks cart wheels from rolling over the moveable cart stop platform section and off said upper surface of the lift platform; and
in the closed position the moveable cart stop platform section is substantially level with an upper surface of the lift platform to allow cart wheels to roll over the moveable cart stop platform section and off said upper surface of the lift platform.

27. The lift system of claim 26, wherein:
with the locking member in an unlocked state and a downforce applied to the cart stop platform section, the cart stop platform section remains substantially level with an upper surface of the lift platform; and
the cart stop platform section is raised by the second spring device upon the downforce being removed.

28. The lift system of claim 27, wherein:
the first spring device has a substantially L-shaped profile that engages the cam member.

29. A cart stop system, comprising:
an essentially planar cart stop platform section rotatably connected at a lower edge to a lift platform having an upper load bearing surface having a channel therein, the channel and the cart stop platform section configured wherein when the cart stop platform section is rotated from a raised position to a lowered position the channel receives the cart stop platform section such that an upper surface of the cart stop platform section is essentially level with said upper surface of the lift platform; and
a first locking member including a cam member, the locking member configured to engage and hold down the cart stop platform section in a closed position, and to release the cart stop platform section to raise to an open position;
the locking member further including a first spring device positioned in contact with the cam member such that the first spring device against the cam member when the cart stop platform section rotates towards the closed position by a downforce;
such that unless a downforce greater than a specified magnitude is applied to the cart stop platform section to lower the cart stop platform section, the cart stop platform section remains in the open position;
wherein in the open position the cart stop platform section is in a raised position and blocks objects from rolling over the cart stop platform section and off an upper surface of the lift platform;
wherein in the closed position the rotatable cart stop platform section is substantially level with the upper surface of the lift platform to allow objects to roll over the cart stop platform section and off said upper surface of the lift platform;
wherein the cam member is connected to a lower edge of the cart stop platform section; and wherein the spring device is configured such that upon the cart stop platform section being positioned in the closed position, the spring device is biased against a portion of the cam member to lock the locking member and maintain the cart stop platform section in the closed position.

30. The cart stop system of claim 29, wherein the rotatable cart stop platform section comprises a first rotatable platform and a second rotatable platform, the first rotatable platform and the second rotatable platform are configured to rotate separately.

31. The cart stop system of claim 30, further comprising a second locking member, wherein the first locking member is configured to hold down the first rotatable platform and the second locking member is configured to hold down and release the second rotatable platform.

32. The cart stop system of claim 29, wherein the spring device is further configured to raise the cart stop platform section from a closed position to an open position when the locking member is unlocked.

33. The cart stop system of claim 32, further comprising a toe press member rotatably connected at an edge to the platform adjacent to the cart stop platform section, the rotatable toe press member having a tab for engaging the cart stop platform section to allow the cart stop platform section to be rotated from an open position to a closed position when a downward force is exerted on the toe press member, wherein in the closed position of the locking member the spring device is biased against a portion of the cam member to maintain the cart stop platform section in the closed position.

34. The cart stop system of claim 29, wherein the rotatable cart stop platform section has a thickness of about 2.54 centimeters.

35. The cart stop system of claim 29, wherein:
the first spring device has a substantially L-shaped profile including a hump;
such that the hump of the spring device engages a recess of the cam member to lock the locking member, and exerts a force against the recess of the cam member when the locking member is locked.

36. The cart stop system of claim 35, wherein a first portion of the cam member rotates against, and eventually passes over, the hump of the spring device as the cart stop platform section is raised to an open position, said rotating action of the first portion of the cam member deforming the hump of the spring device to disengage the hump of the spring device from the recess of the cam member and unlock the locking member.

37. The cart stop system of claim 29, wherein:
the first spring device rotatably biases against the cam member when the cart stop platform section is moved towards the closed position by a downforce applied to the cart stop platform section.

38. The lift system of claim 29, wherein:
a protrusion of the cam member rests against a bottom of the channel when the cart stop platform section is in the open position; and
upward rotation of the cart stop platform section is limited when the protrusion of the cam member rests against the bottom of the channel.

39. A cart stop system, comprising:
an essentially planar cart stop platform section rotatably connected at a lower edge to a lift platform having an upper load bearing surface having a channel therein, the channel and the cart stop platform section configured wherein when the cart stop platform section is rotated from a raised position to a lowered position the channel receives the cart stop platform section such that an upper surface of the cart stop platform section is essentially level with said upper surface of the lift platform;
a moveable cart stop platform section;
a moveable toe press extension having a tab for engaging the moveable cart stop platform section to allow the moveable cart stop platform section to be rotated from an open position to a closed position by a downward force exerted on the toe press extension;
a first locking member comprising a cam member and a first spring device positioned in contact with the cam member whereby the first spring device biases against the cam member, wherein the cam member is connected to a lower edge of the toe press extension such that when the locking member is locked the first spring device is biased against a portion of the cam member to maintain the toe press extension in a closed position; and
a second spring device positioned to engage and raise the cart stop platform section to an open position when the locking member is unlocked.

40. The cart stop system of claim 39, wherein:
the toe press extension is adjacent to the cart stop platform section;
when the first spring device is biased against said portion of the cam member to maintain the toe press extension in a closed position, said tab holds down the moveable cart stop platform section in the closed position despite the action of the second spring; and
as the toe press extension is raised to an open position by an applied force, said portion of the cam member rotates against the first spring device and deforms the spring device to disengage the first spring device from said portion of the cam member and unlock the locking member, such that the second spring device raises the moveable cart stop platform section to an open position.

41. The cart stop system of claim 40, wherein:
with the locking member in an unlocked state and a downforce applied to the cart stop platform section, the cart stop platform section remains substantially level with an upper surface of the lift platform; and
the cart stop platform section is raised by the second spring device upon the downforce being removed.

42. The cart stop system of claim 40, wherein:
the first spring device has a substantially L-shaped profile that engages the cam member.

* * * * *